US012755279B2

(12) United States Patent
Binder et al.

(10) Patent No.: US 12,755,279 B2
(45) Date of Patent: Oct. 6, 2026

(54) NON-FUNGIBLE TOKEN DOCUMENT PLATFORM

(71) Applicant: TOKENFORM LLC, Denver, CO (US)

(72) Inventors: Jeffrey Binder, Denver, CO (US); Charles Hasek, Denver, CO (US); Lindsay Gardner, West Hollywood, CA (US)

(73) Assignee: TOKENFORM LLC, Denver, CO (US)

( * ) Notice: Subject to any disclaimer, the term of this patent is extended or adjusted under 35 U.S.C. 154(b) by 117 days.

(21) Appl. No.: 18/237,519

(22) Filed: Aug. 24, 2023

(65) Prior Publication Data

US 2024/0070662 A1 Feb. 29, 2024

Related U.S. Application Data

(60) Provisional application No. 63/400,658, filed on Aug. 24, 2022.

(51) Int. Cl.
*G06Q 30/00* (2023.01)
*G06Q 20/36* (2012.01)
*G06Q 20/38* (2012.01)

(52) U.S. Cl.
CPC ........... *G06Q 20/389* (2013.01); *G06Q 20/36* (2013.01)

(58) Field of Classification Search
CPC .................................................... G06Q 20/389
USPC ............ 705/39, 1.1, 69, 64, 50, 75; 713/159
See application file for complete search history.

(56) References Cited

U.S. PATENT DOCUMENTS 11,501,297 B1 * 11/2022 Tai ........................ G06Q 20/401
2022/0198447 A1 * 6/2022 Haruna .................. G06Q 20/02

OTHER PUBLICATIONS ip.com NPL Search History.*
International Search Report and Written Opinion issued Oct. 12, 2023 in corresponding PCT Application No. PCT/US2023/031019 filed Aug. 24, 2023.

* cited by examiner

*Primary Examiner* — John H. Holly
(74) *Attorney, Agent, or Firm* — Brownstein Hyatt Farber Schreck, LLP

(57) ABSTRACT

A non-fungible token ("NFT") document platform includes a host platform that is operable to create and/or perform one or more transactions related to one or more NFTs on behalf of and/or for one or more other entities. Creation of the NFTs may involve creation of one or more smart contracts, storage of the smart contracts and/or the NFTs in one or more blockchains, and so on. The NFT document platform may also be operable to mint one or more documents, such as one or more birth certificates, contracts and other signed documents, titles, prescriptions, licenses and/or identification documents, checks, money, gift cards, and so on. The smart contracts and/or NFTs may correspond to the one or more minted documents. The NFTs may be usable to authenticate the minted documents, evidence ownership of the minted documents, control the ability to perform transactions regarding the minted documents, and so on.

20 Claims, 15 Drawing Sheets

NON-FUNGIBLE TOKEN DOCUMENT PLATFORM

CROSS-REFERENCE TO RELATED APPLICATION(S)

This application is a nonprovisional patent application of and claims the benefit under 35 U.S.C. § 119(e) of U.S. Provisional Patent Application No. 63/400,658, filed Aug. 24, 2022, and titled "Non-Fungible Token Document Platform", the contents of which are incorporated herein by reference in its entirety.

FIELD

The described embodiments relate generally to non-fungible tokens. More particularly, the present embodiments relate to a non-fungible token document platform.

BACKGROUND

A blockchain is a distributed ledger that is shared among nodes of a decentralized computer network. Blockchains are similar to databases in that they store information electronically in digital format. However, unlike a database, blockchains collect information together in groups, known as blocks. As blocks are filled they are closed, timestamped, and linked to a previously filled block. This data structure inherently makes an irreversible timeline of data when implemented in a decentralized nature.

One use of blockchains is to store non-fungible tokens (NFTs). NFTs are cryptographic assets on a blockchain with unique identification codes and metadata that distinguish them from each other. NFTs are typically used to represent rights to real world assets, such as artworks. NFTs are associated with a smart contract stored on the blockchain that controls transactions that can be performed with the NFTs and who can perform them. NFTs are accessible using private and/or public keys stored in a local and/or cloud-based NFT wallet assigned to the owner of the respective NFT, and ownership is tracked on the blockchain.

Overview

The present disclosure relates to a non-fungible token ("NFT") document platform. The NFT document platform includes a host platform that is operable to create and/or perform one or more transactions related to one or more NFTs on behalf of and/or for one or more other entities, such as one or more issuer instances, user platforms, intermediaries, and so on. Creation of the NFTs may involve creation of one or more smart contracts, storage of the smart contracts and/or the NFTs in one or more blockchains, and so on. The NFT document platform may also be operable to mint one or more documents, such as one or more birth certificates, contracts and other signed documents, titles (such as house titles, car titles, and so on), prescriptions, licenses and/or identification documents, checks, money, gift cards, and so on. The smart contracts and/or NFTs may correspond to the one or more minted documents. The NFTs may be usable to authenticate the minted documents, evidence ownership of the minted documents, control the ability to perform transactions regarding the minted documents, and so on. This effectively is multi-factor authentication of a printed document, which has heretofore been limited to digital documents.

In various embodiments, a host platform system includes a non-transitory storage medium that stores instructions and a processor. The processor executes the instructions to receive information for a minted document, generate a smart contract and an associated non-fungible token (NFT) for the minted document, store the smart contract and the associated NFT on a blockchain, and add the associated NFT to a token wallet.

In some examples, the processor stores the information for the minted document. In a number of implementations of such examples, the processor stores the information for the minted document in a storage area separate from the blockchain.

In various examples, the processor mints the minted document. In some examples, the minted document is at least one of a birth or death certificate a contract, a signed document, a title, a prescription, a license, an identification document, a check, a receipt, a credit card, a lien, tax records, an invoice, money, fungible currency; a ticket, a certificate, a diploma; a judicial orders, a filing, a judgment, a medical record, an invitation, a certificate of authenticity, a gift card, a coupon, or a document that can be authenticated using an NFT.

In a number of examples, the processor implements a frontend that is operable to communicate with an issuer instance that issued the minted document. In various implementations of such examples, the processor is operable to modify at least one of the associated NFT or the smart contract in response to a request from the issuer instance received via the frontend.

In some examples, the processor implements a frontend that is operable to communicate with the token wallet. In a number of examples, the processor generates the token wallet. In various implementations of such examples, the processor generates the token wallet using a communication identifier provided with the information for the minted document. In some implementations of such examples, the processor transmits a notification regarding the NFT to the communication identifier.

In a number of examples, a portion of the smart contract on the blockchain is encrypted. In various examples, a portion of the NFT on the blockchain is encrypted. In a number of examples, the smart contract controls use of the NFT.

In some embodiments, a method includes verifying the identity of a requestor using at least one processor, generating a signature smart contract using the at least one processor, generating a signature NFT using the at least one processor, storing the signature smart contract and the signature NFT on a blockchain using the at least one processor, and adding a signature transaction on the blockchain using the at least one processor in response to receiving a sign request from the requestor.

In various examples, the signature NFT includes an image of a signature of the requestor. In some examples, the blockchain tracks a token wallet associated with the signature NFT.

In a number of embodiments, a method includes receiving a request for a check to generate using at least one processor, withdrawing funds for the check using the at least one processor, generating an NFT and an associated smart contract for the check using the at least one processor, storing the NFT and the associated smart contract on a blockchain using the at least one processor, and associating the NFT with a token wallet using the at least one processor.

In various examples, the method further includes redeeming the NFT. In some implementations of such examples, redeeming the NFT includes revoking the NFT and providing the funds.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
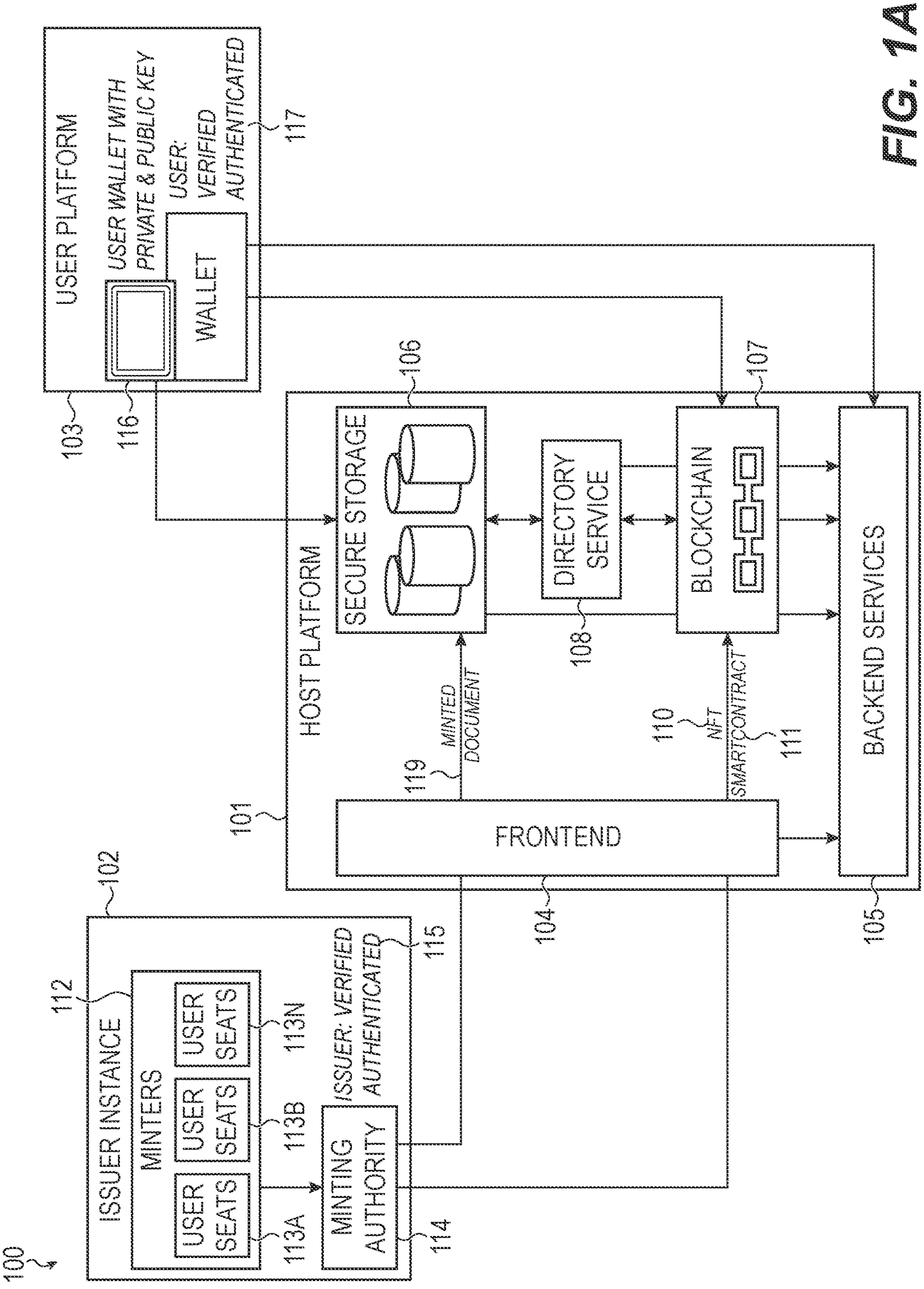
FIG. 1A depicts an example non-fungible token document platform system.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

There are many physical documents in the modern world that may need to be authenticated in order to be useful as opposed to being useful simply for any information that they contain. Examples of such include birth certificates, contracts and other signed documents, titles (such as house titles, car titles, and so on), prescriptions, licenses and/or identification documents, checks, money, gift cards, and so on. Many different technologies (such as water marks, embossing, embedded devices, and so on) have been developed to demonstrate authenticity of such documents and attempt to control fraud. However, such fraud still exists, and often an issuer and/or other expert must be brought in to authenticate such a document despite one or more different technologies intended to demonstrate authenticity.

Further, issuers of such documents and/or other entities often maintain large, expensive, and complex databases of information about such documents that have been issued. Without such databases, the issuers of such documents and/or other entities themselves may be unable to say whether or not a document is authentic or not, despite any technology intended to demonstrate such. This increases cost, complexity, and burden on the issuers of such documents and/or other entities, and results in such databases being weak points for failure and/or attack. Should such databases fail, the issuers of such documents and/or other entities may be unable to determine whether or not a document is authentic, or even whether or not such a document was ever issued.

The present disclosure relates to a non-fungible token ("NFT") document platform. The NFT document platform includes a host platform that is operable to create and/or perform one or more transactions related to one or more NFTs on behalf of and/or for one or more other entities, such as one or more issuer instances, user platforms, intermediaries, and so on. Creation of the NFTs may involve creation of one or more smart contracts, storage of the smart contracts and/or the NFTs in one or more blockchains, and so on. The NFT document platform may also be operable to mint one or more documents, such as one or more birth certificates, contracts and other signed documents, titles (such as house titles, car titles, and so on), prescriptions, licenses and/or identification documents, checks, money, gift cards, and so on. The smart contracts and/or NFTs may correspond to the one or more minted documents. The NFTs may be usable to authenticate the minted documents, evidence ownership of the minted documents, control the ability to perform transactions regarding the minted documents, and so on.

In this way, the NFT document platform may provide technological solutions to authentication of documents issues, particularly technological solutions that arise from the technological problems introduced by attempting to authenticate documents in a digital environment. A system including the NFT document platform may be able to perform document authentication and/or other document, NFT, and/or other functions that the system would not previously have been able to perform absent the technology disclosed herein. This may enable the system to operate more efficiently while consuming fewer hardware and/or software resources as more resource consuming techniques may be omitted. Further, one or more databases and/or other components may be omitted while still enabling document authentication and/or other document, NFT, and/or other functions, reducing unnecessary hardware and/or software components and providing greater system flexibility.

These and other embodiments are discussed below with reference to FIGS. 1A-11. However, those skilled in the art will readily appreciate that the detailed description given herein with respect to these Figures is for explanatory purposes only and should not be construed as limiting.

FIG. 1A depicts an example NFT document platform system 100. The system 100 includes a host platform 101 that is operable to create and/or perform one or more transactions related to one or more NFTs 110 on behalf of and/or for one or more other entities, such as one or more issuer instances 102, user platforms 103, intermediaries (not shown), and so on. Creation of the NFTs 110 may involve creation of one or more smart contracts 111, storage of the smart contracts 111 and/or the NFTs 110 in one or more blockchains, automatic creation and/or maintenance of one or more local and/or cloud-based token wallets (an electronic repository associated with storage of at least one or more private keys associated with one or more NFTs 110 and/or other tokens associated with one or more blockchains), and so on. In some cases, the private keys for the NFTs 110 and/or other encrypted and/or unencrypted data (such as one or more public keys, copies of the NFTs 110, payloads, and so on) may be stored in one or more local and/or cloud-based token wallets. The NFT document platform may also be operable to mint one or more documents (in the context of the present application, minting a document may be creation of a physical and/or digital document that is uniquely associated with one or more smart contracts 111 and/or NFTs 110), such as one or more birth certificates, contracts and other signed documents, titles (such as house titles, car titles, and so on), prescriptions, licenses and/or identification documents, checks, money, gift cards, and so on. The smart contracts 111 and/or NFTs 110 may correspond to the one or more minted documents 119 and may even be created using data from and/or otherwise associated with the minted documents 119. The NFTs may be usable to authenticate the minted documents 119, evidence ownership of the minted documents 119, control the ability to perform transactions regarding the minted documents 119, and so on.

For example, an online tax preparation service may be a first issuer instance 102 and a streaming television and movie service may be a second issuer instance. The online tax preparation service may allow a customer using the user platform 103 to create one or more NFTs and/or associated smart contracts via the host platform 101 to delegate authority to a tax preparation professional to access stored tax information for the customer in order to review the customer's tax forms. The tax professional may not have a token wallet associated with the online tax preparation service. However, the host platform 101 may have automatically created a token wallet associated with the tax professional's email address for the tax professional's streaming television and movie service account in order to store NFTs that the tax professional uses to access streaming television and movie content from the streaming television and movie service. When the customer delegates authority to the tax professional, the customer may provide the tax professional's email address. The host platform 101 may recognize that a token wallet is already associated with that email address and may associate the NFT that is accordingly created with that token wallet. However, token wallets may include hidden areas. When the tax professional accesses the token wallet for the streaming television and movie service, the tax professional may not see the NFT for the online tax preparation service. However, when the online tax preparation service associates the NFT with the token wallet, the tax professional may be sent an email notifying the tax professional that the customer has delegated the authority. The email may include a link to access the customer's tax forms, which may both send a one-time password to the tax professional's email account and prompt the tax professional to enter the sent one-time password. When the tax professional provides the sent one-time password, the online tax preparation service may allow the tax professional to access the customer's tax forms. Various configurations are possible and contemplated without departing from the scope of the present disclosure.

Although the above example is described in the context of an online tax preparation service and a streaming television and movie service, it is understood that this is an example. In various implementations, the techniques of the present disclosure may be used with anything that uses credentials. Various configurations are possible and contemplated without departing from the scope of the present disclosure.

The host platform 101 may include one or more frontends 104 and/or one or more backend services 105. The frontend 104 may include one or more application programming interfaces or "APIs". Similarly, the backend services 105 may be accessed using one or more APIs. The frontend 104 may be usable by one or more issuer instances 102 to request creation of and/or performance of one or more transactions and/or other actions related to one or more NFTs 110, smart contracts 111, and/or minted documents 119. The frontend 104 may interact with one or more unsecure and/or secure storages 106 and/or one or more blockchains 107 to store one or more NFTs 110, smart contracts 111, minted documents 119, and so on. A directory service 108 may by usable by the host platform 101 to associate assets in the one more unsecure and/or secure storages 106 and/or one or more blockchains 107. The frontend 104 and/or the one or more blockchains 107 may be communicably connected to the backend services 105.

The issuer instance 102 may include one or more minters 112 that may include one or more user seats 113A-113N, a minting authority 114, an issuer 115, and so on. The issuer 115 may be verified and authenticated by the host platform 101, such as by communication over a verified connection, using multi-factor authentication (such as a login and/or password, a one-time password sent to a known email address and/or other communication address, one or more authenticator apps, and so on), and so on. The minting authority 114 and/or the issuer instance 102 may be communicably connected to the frontend 104.

The user platform 103 may include a user wallet 116 and a user 117. The user wallet 116 may be a token wallet. The user wallet 116 may store one or more private and/or public keys related to one or more NFTs. The user wallet 116 and/or the user platform 103 may be communicably connected to the one more unsecure and/or secure storages 106, one or more blockchains 107, and/or backend services 105. The user 117 may be verified and authenticated by the host platform 101, such as by communication over a verified connection, using multi-factor authentication (such as a login and/or password, a one-time password sent to a known email address and/or other communication address, one or more authenticator apps, and so on), and so on.

Figure 1B:
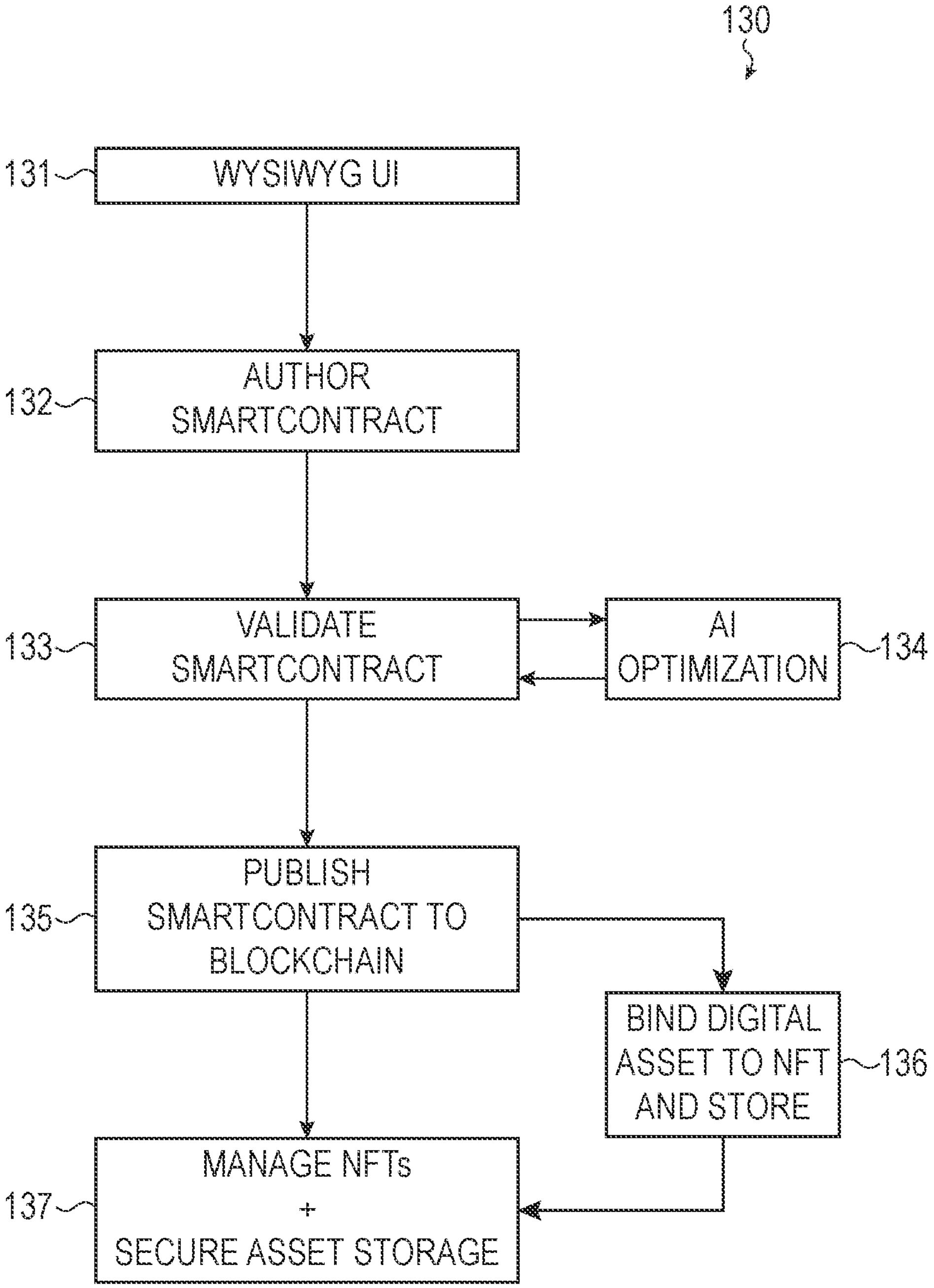
FIG. 1B depicts a flow of using creation and minting of a smart contract and non-fungible token. The flow may be performed by the system of FIG. 1A.

FIG. 1B depicts a flow 130 of using creation and minting of a smart contract and non-fungible token. The flow may be performed by the system 100 of FIG. 1A. A what you see is what you get ("WYSIWYG") and/or other user interface 131 may be provided. The user interface 131 may be used to author one or more smart contracts 132. The authored smart contracts may be validated 133 and/or optimized using artificial intelligence (AI) 134. The validated and/or optimized smart contract (and/or any generated related one or more NFTs) may be published to one or more blockchains 135. A digital asset related to the smart contract may be bound to the one or more NFTs and stored 136. The one or more NFTs may then be managed and the digital asset may be securely and/or otherwise stored 137.

Although the flow 130 illustrates a particular flow, it is understood that this is an example. In other implementations, other flows of the same, similar, and/or different operations may be used. Various configurations are possible and contemplated without departing from the scope of the present disclosure.

Figure 1C:
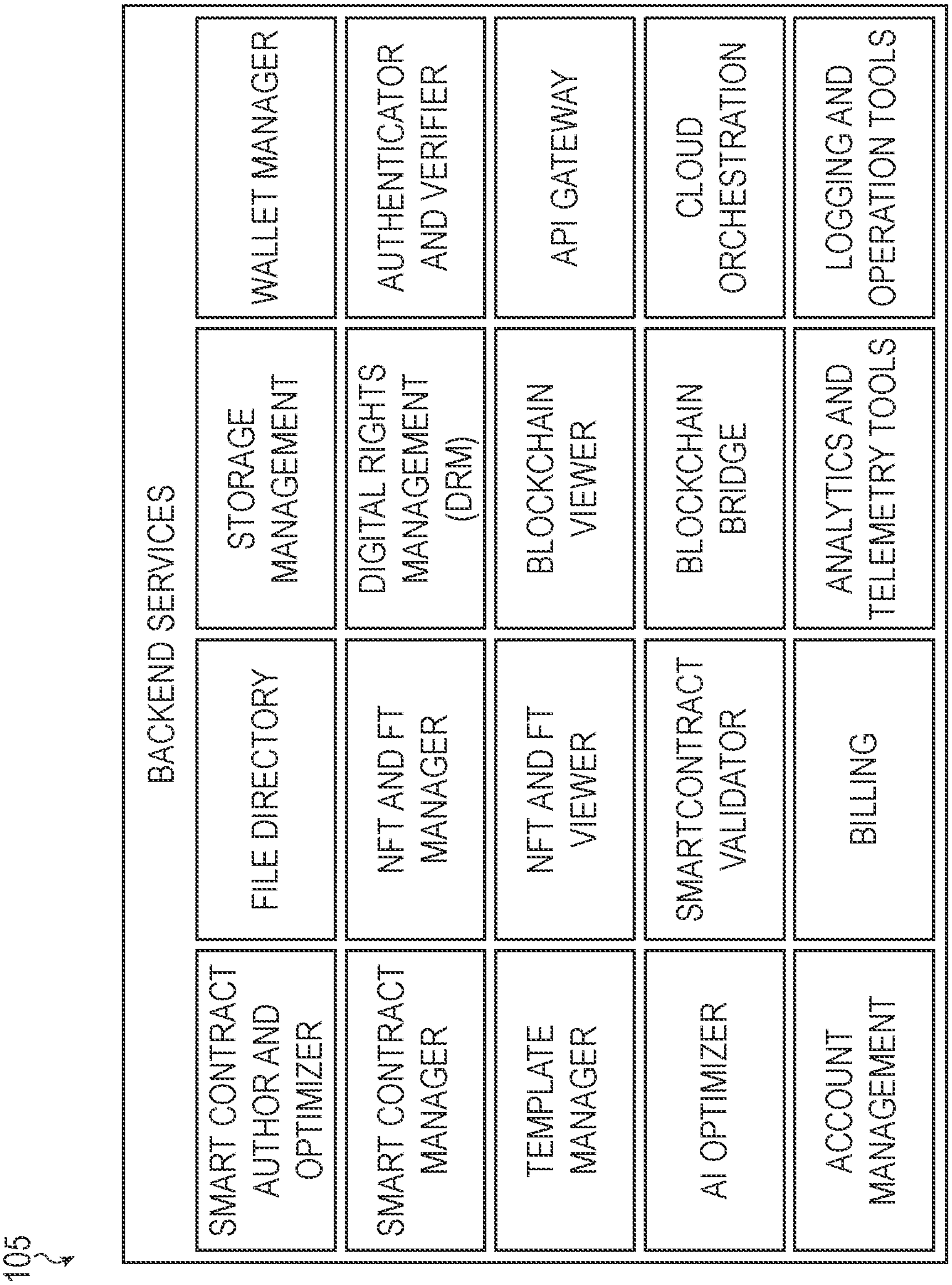
FIG. 1C depicts a list of backend services. The backend services may support and/or be provided by the system of FIG. 1A.

FIG. 1C depicts a list of backend services 105. The backend services 105 may support and/or be provided by the system 100 of FIG. 1A. The list may include one or more smart contract authors and/or optimizers, file directories, storage management, wallet managers, smart contract managers, NFT and FT managers, digital rights management (DRM), authenticators and/or verifiers, template managers, NFT and/or FT viewers, blockchain viewers, API gateways, AI optimizers, smart contract validators, blockchain bridges, cloud orchestration, account management, billing, analytics and/or telemetry tools, logging and operation tools, and so on.

Although the list illustrates examples of backend services 105, it is understood that this is an example. In other implementations, other backend services 105 may be used. Various configurations are possible and contemplated without departing from the scope of the present disclosure.

Figure 1D:
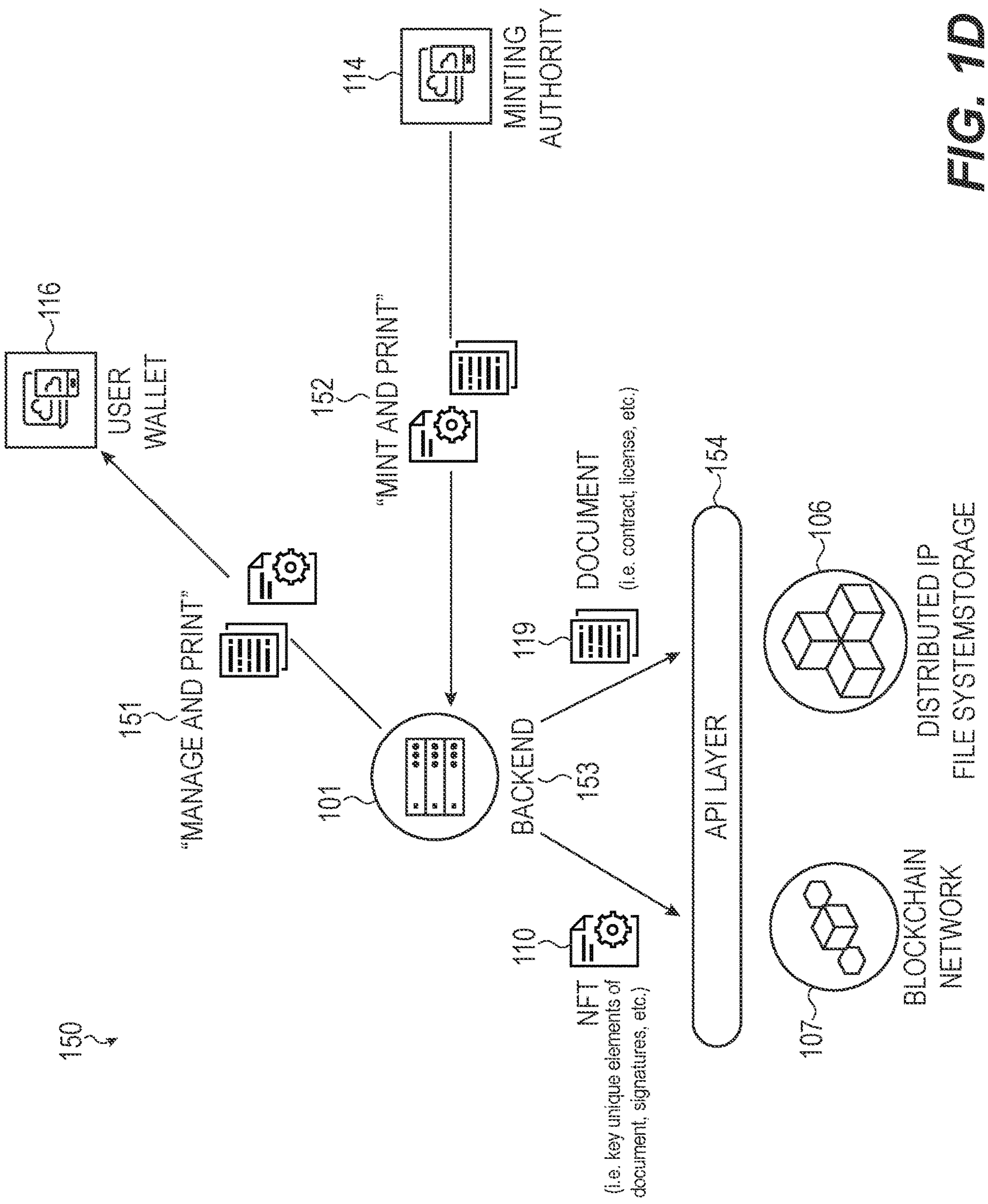
FIG. 1D depicts mint-print-manage functions. The mint-print-manage functions may be performed and/or supported and/or provided by the system of FIG. 1A.

FIG. 1D depicts mint-print-manage functions 150. The mint-print-manage functions 150 may be performed and/or supported and/or provided by the system of FIG. 1A. As shown, a host platform may communicate with a user wallet 116 and/or a minting authority 114 to perform manage and print functions 151 and/or mint and print functions 152. The host platform 101 may use a backend 153 and/or an API layer 154 to store one or more NFTs 110 (which may include key unique elements of one or more minted documents 119, signature, and so on) in one or more blockchain 107 networks and/or one or more minted documents 119 (such as one or more contracts, licenses, and so on) in a distributed internet protocol file system storage and/or other unsecure and/or secure storage 106.

Although the mint-print-manage functions 150 are illustrated and described with a particular configuration, it is understood that this is an example. In other implementations, other configurations of the same, similar, and/or different operations may be used. Various configurations are possible and contemplated without departing from the scope of the present disclosure.

Returning to FIG. 1A, although the system 100 is illustrated and described as including particular components arranged in a particular configuration, it is understood that this is an example. In a number of implementations, various configurations of various components may be used without departing from the scope of the present disclosure.

For example, the system 100 is illustrated and described as the user platform 103 including the user wallet 116. However, it is understood that this is an example. In various implementations, the system 100 may include host platform 101 that automatically generates and/or maintains one or more local and/or cloud-based token wallets, such as token wallets associated with one or more communication addresses (such as one or more email addresses, telephone numbers, social media messaging addresses, and so on) of one or more users. This may increase the likelihood that users will use the system 100 as the users do not have to know how to create token wallets, as well as simplifying user interfaces and improving the operation of computing devices used to implement the system 100. Various configurations are possible and contemplated without departing from the scope of the present disclosure.

Figure 2:
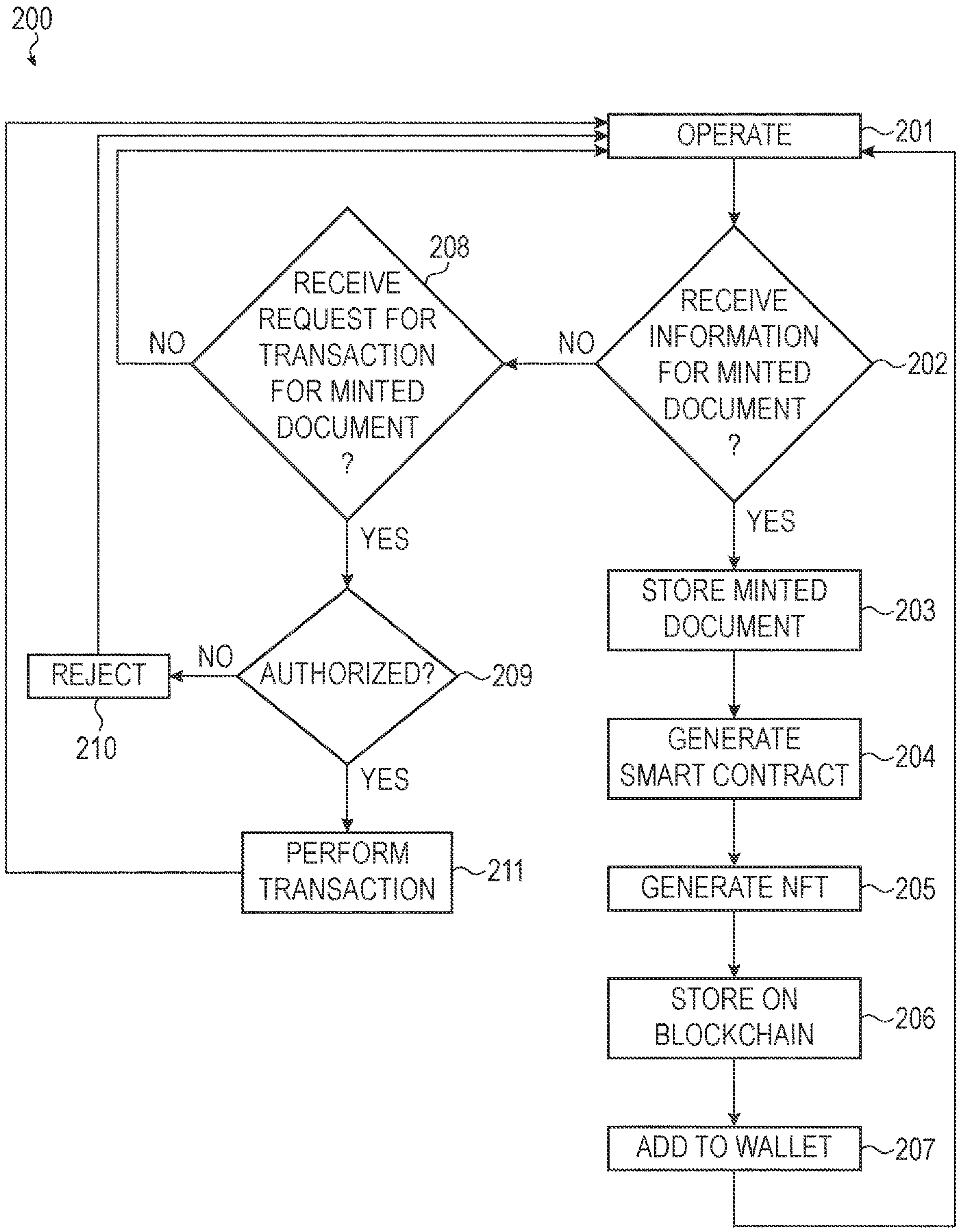
FIG. 2 depicts a flow chart illustrating a first example method for operating a non-fungible token document platform system. This method may be performed by the system of FIG. 1A.

FIG. 2 depicts a flow chart illustrating a first example method 200 for operating an NFT document platform system. This method may be performed by the system 100 of FIG. 1A.

At operation 201, an electronic device (such as one or more computing devices associated with the host platform 101 of FIG. 1A, the issuer instance 102 of FIG. 1A, the user platform 103 of FIG. 1A, and/or another device or system) may operate. The flow may proceed to operation 202 where the electronic device may determine whether or not information for a minted document is received. Such minted documents may include one or more birth certificates, contracts and other signed documents, titles (such as house titles, car titles, and so on), prescriptions, licenses and/or identification documents, checks, money, gift cards, and so on. If so, the flow may proceed to operation 203. Otherwise, the flow may proceed to operation 208.

At operation 203, the electronic device may store the minted document and/or the information for the minted document. The electronic device may store the minted document and/or the information for the minted document on one or more blockchains (such as the blockchain 107 of FIG. 1A), in one or more storage areas (such as the secure storage 106 of FIG. 1A), and so on.

At operation 204, the electronic device may generate one or more smart contracts. The smart contract may control minting of the minted document, ownership of the minted document, status of the minted document, how status of the minted document may be changed, transfer of the minted document, transactions involving the minted document, and so on.

In some examples, template smart contracts may be generated for each kind of minted document (such as one or more birth certificates, contracts and other signed documents, titles (such as house titles, car titles, and so on), prescriptions, licenses and/or identification documents, checks, money, gift cards, and so on). Such templates may then be customized based on the specifics of each minted document (such as a driver's license template that is customized with a person's name, driver's license number, address, driver's license status, expiration date, issue date, and so on.

The flow may proceed to operation 205 where the electronic device may generate one or more NFTs. The NFT may be associated with the smart contract, the minted document, and so on.

Next, the flow may proceed to 206 where the electronic device may store the smart contract and/or the NFT on the blockchain. If the minted document or the information for the minted document is stored on a blockchain, the smart contract and/or the NFT may be stored on the same blockchain, associated with the minted document, and so on.

The flow may then proceed to operation 207 where the NFT may be added to and/or otherwise associated with one or more token wallets before the flow returns to operation 201 where the electronic device may continue to operate.

At operation 208, the electronic device may determine whether or not one or more requests for one or more transactions for one or more minted documents are received. For example, a request to suspend a driver's license may be received from an issuer of the driver's license. By way of another example, a request to print a new physical copy of a birth certificate may be received from a person to whom the birth certificate was issued. If not, the flow may return to operation 201 where the electronic device may continue to operate. Otherwise, the flow may proceed to operation 209.

At operation 209, the electronic device may determine whether or not the requestor is authorized for the requested transaction. For example, the electronic device may determine that the requestor is authorized because the requestor is associated with a token wallet associated with the NFT, is the issuer of the minted document, is authorized by the smart contract, has established their identity as the person to whom the minted document was issued (such as by providing a one-time password transmitted to an email address or other communication identifier associated with the person), and so on. If not, the flow may proceed to operation 210 where the electronic device may reject the request before the flow returns to operation 201 and the electronic device continues to operate. Otherwise, the flow may proceed to operation 211 where the electronic device may perform the transaction before the flow returns to operation 201 and the electronic device continues to operate.

For example, the electronic device may send the NFT to a local and/or cloud-based token wallet, such as a local and/or cloud-based token wallet associated with a person to whom the minted document is issued. By way of another example, the electronic device may send the NFT to a local and/or cloud-based token wallet associated with an issuer of the minted document, who may then transfer the NFT to a local and/or cloud-based token wallet associated with a person to whom the minted document is issued. Various configurations are possible and contemplated without departing from the scope of the present disclosure.

By way of illustration, a driver's license issuing authority may determine to issue a driver's license to a person. The driver's license issuing authority may mint the driver's license for the person. The driver's license issuing authority may also send information for the minted driver's license to a host platform, which stores information for the driver's license, an associated smart contract, an associated NFT and so on in one or more blockchains and/or other storage areas. The NFT may be associated with a token wallet associated with the person. The driver's license issuing authority may also print a physical copy of the driver's license for the person, which may include one or more references (such as a web address) to the NFT, smart contract, stored information for the driver's license, and so on. Various configurations are possible and contemplated without departing from the scope of the present disclosure.

Subsequently, the person may lose the physical copy of the driver's license and/or access to the token wallet associated with the person. If the person loses the physical copy of the driver's license, the person may use the NFT to prove authorization to have a new physical copy printed. If the person loses access to the token wallet, the person may use the physical copy of the driver's license and/or one or more other mechanisms (such as providing a one-time password transmitted to an email address or other communication identifier associated with the person) to prove the person's identity in order to revoke the NFT and have a new NFT generated and associated with another token wallet that is currently associated with the person. Various configurations are possible and contemplated without departing from the scope of the present disclosure.

In some implementations, the smart contract, NFT, and/or blockchain may include some and/or all of the information from the minted document, such as where the NFT includes an image of a driver's license, birth certificate, and so on. In various such implementations, some and/or all of such information may be encrypted. In other implementations, the smart contract, NFT, and/or blockchain may not include the information from the minted document and may instead be used to access the information from the minted document that is stored elsewhere, such as where the NFT stored on the blockchain is a security token that may be used to access the minted document in a storage area (such as the secure storage 106 of FIG. 1A). Various configurations are possible and contemplated without departing from the scope of the present disclosure.

In various examples, this example method 200 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 200 is illustrated and described as including particular operations performed in a particular order, it is understood that this is an example. In various implementations, various orders of the same, similar, and/or different operations may be performed without departing from the scope of the present disclosure.

For example, the method 200 is illustrated and described as determining whether or not information for one or more minted documents is received. However, it is understood that this is an example. In some implementations, one or more requests to mint one or more documents may be received and/or the method may include minting one or more documents. Various configurations are possible and contemplated without departing from the scope of the present disclosure.

By way of another example, the above illustrates and describes the same electronic device performing operations 202-207 and 208-211. However, it is understood that this is an example. In some implementations, different electronic devices may perform operations 202-207 and 208-211 and/or subgroups of operations 202-207 and 208-211. Various configurations are possible and contemplated without departing from the scope of the present disclosure.

Figure 3:
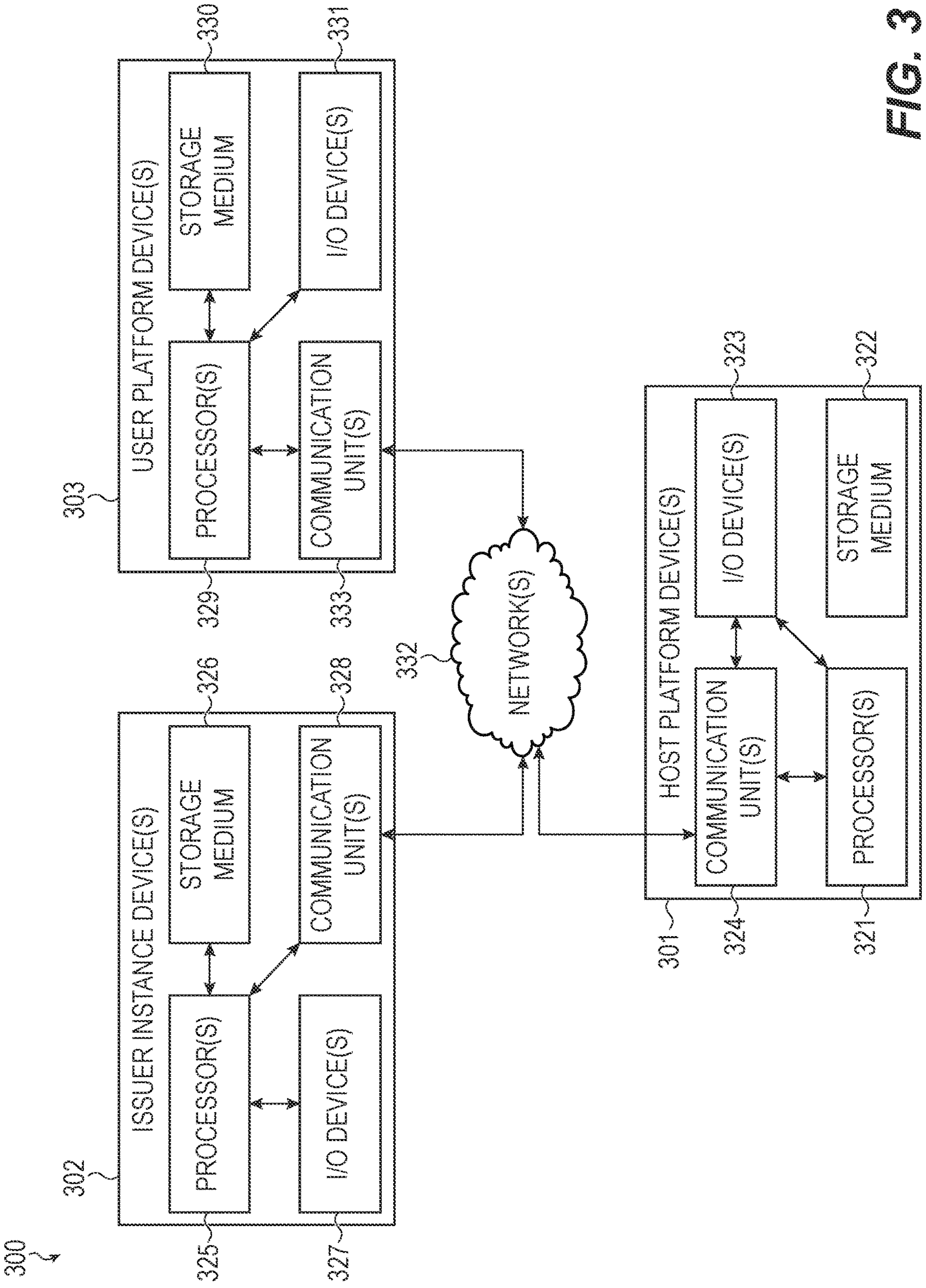
FIG. 3 depicts example relationships among example components that may be used to implement the system of FIG. 1A.

FIG. 3 depicts example relationships 300 among example components that may be used to implement the system 100 of FIG. 1A.

The host platform 101 of FIG. 1 may be implemented using one or more host platform devices 301. The host platform device 301 may be any kind of electronic device. Examples of such devices include, but are not limited to, one or more desktop computing devices, laptop computing devices, server computing devices, mobile computing devices, tablet computing devices, set top boxes, digital video recorders, televisions, displays, wearable devices, smart phones, digital media players, and so on. The host platform device 301 may include one or more processors 321 and/or other processing units and/or controllers, one or more non-transitory storage media 322 (which may take the form of, but is not limited to, a magnetic storage medium; optical storage medium; magneto-optical storage medium; read only memory; random access memory; erasable programmable memory; flash memory; and so on), one or more communication units 324 (such as one or more network adapters and/or other devices used by a device to communicate with one or more other devices), one or more input and/or output components 323 (such as one or more displays, speakers, touch screens, computer mice, track pads, keyboards, printers, and so on) and/or one or more other components. The processor 321 may execute instructions stored in the non-transitory storage medium 322 to perform various functions. Such functions may include any of the functions discussed herein with respect to the host platform 101 of FIG. 1A; communicating with one or more issuer instance devices 302, user platform devices 303, and/or one or more other devices via one or more wired and/or wireless networks 332; and so on. Alternatively and/or additionally, the host platform device 301 may involve one or more memory allocations configured to store at least one executable asset and one or more processor allocations configured to access the one or more memory allocations and execute the at least one executable asset to instantiate one or more processes and/or services, such as one or more host platform services, and so on.

Similarly, the issuer instance 102 of FIG. 1A may be implemented using one or more issuer instance devices 302. The issuer instance device 302 may be any kind of electronic device. Examples of such devices include, but are not limited to, one or more desktop computing devices, laptop computing devices, server computing devices, mobile computing devices, tablet computing devices, set top boxes, digital video recorders, televisions, displays, wearable devices, smart phones, digital media players, and so on. The issuer instance device 302 may include one or more processors 325 and/or other processing units and/or controllers, one or more non-transitory storage media 326 (which may take the form of, but is not limited to, a magnetic storage medium; optical storage medium; magneto-optical storage medium; read only memory; random access memory; erasable programmable memory; flash memory; and so on), one or more communication units 328 (such as one or more network adapters and/or other devices used by a device to communicate with one or more other devices), one or more input and/or output components 327 (such as one or more displays, speakers, touch screens, computer mice, track pads, keyboards, printers, and so on) and/or one or more other components. The processor 325 may execute instructions stored in the non-transitory storage medium 326 to perform various functions. Such functions may include any of the functions discussed herein with respect to the issuer instance 102 of FIG. 1A; communicating with one or more host platform devices 301, user platform devices 303, and/or one or more other devices via one or more wired and/or wireless networks 332; and so on. Alternatively and/or additionally, the issuer instance device 302 may involve one or more memory allocations configured to store at least one executable asset and one or more processor allocations configured to access the one or more memory allocations and execute the at least one executable asset to instantiate one or more processes and/or services, such as one or more issuer instance services, and so on.

Likewise, the user platform 103 of FIG. 1A may be implemented using one or more user platform devices 303. The user platform device 303 may be any kind of electronic device. Examples of such devices include, but are not limited to, one or more desktop computing devices, laptop computing devices, server computing devices, mobile computing devices, tablet computing devices, set top boxes, digital video recorders, televisions, displays, wearable devices, smart phones, digital media players, and so on. The user platform device 303 may include one or more processors 329 and/or other processing units and/or controllers, one or more non-transitory storage media 330 (which may take the form of, but is not limited to, a magnetic storage medium; optical storage medium; magneto-optical storage medium; read only memory; random access memory; erasable programmable memory; flash memory; and so on), one or more communication units 333 (such as one or more network adapters and/or other devices used by a device to communicate with one or more other devices), one or more input and/or output components 331 (such as one or more displays, speakers, touch screens, computer mice, track pads, keyboards, printers, and so on) and/or one or more other components. The processor 329 may execute instructions stored in the non-transitory storage medium 330 to perform various functions. Such functions may include any of the functions discussed herein with respect to the user platform 103 of FIG. 1A; communicating with one or more issuer instance devices 302, host platform devices 301, and/or one or more other devices via one or more wired and/or wireless networks 332; and so on. Alternatively and/or additionally, the user platform device 303 may involve one or more memory allocations configured to store at least one executable asset and one or more processor allocations configured to access the one or more memory allocations and execute the at least one executable asset to instantiate one or more processes and/or services, such as one or more user platform services, and so on.

Additionally, FIG. 1A may involve one or more other devices not shown. Such other devices may be any kind of electronic device. Examples of such other devices include, but are not limited to, one or more desktop computing devices, laptop computing devices, server computing devices, mobile computing devices, tablet computing devices, set top boxes, digital video recorders, televisions, displays, wearable devices, smart phones, digital media players, and so on. The other devices may include one or more processors and/or other processing units and/or controllers, one or more non-transitory storage media (which may take the form of, but is not limited to, a magnetic storage medium; optical storage medium; magneto-optical storage medium; read only memory; random access memory; erasable programmable memory; flash memory; and so on), one or more communication units (such as one or more network adapters and/or other devices used by a device to communicate with one or more other devices), one or more input and/or output components (such as one or more displays, speakers, touch screens, computer mice, track pads, keyboards, printers, and so on) and/or one or more other components. The processor may execute instructions stored in the non-transitory storage medium to perform various functions. Such functions may include any of the functions discussed herein; communicating with one or more issuer instance devices 302, user platform devices 303, host platform devices 301, and/or one or more other devices via one or more wired and/or wireless networks 332; and so on. Alternatively and/or additionally, the other devices may involve one or more memory allocations configured to store at least one executable asset and one or more processor allocations configured to access the one or more memory allocations and execute the at least one executable asset to instantiate one or more processes and/or services, such as one or more other device services, and so on.

As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices and systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

Example information can include, but may not be limited to: personal identification information (e.g., names, social security numbers, telephone numbers, email addresses, physical addresses, driver's license information, passport numbers, and so on); identity documents (e.g., driver's licenses, passports, government identification cards or credentials, and so on); protected health information (e.g., medical records, dental records, and so on); financial, banking, credit, or debt information; third-party service account information (e.g., usernames, passwords, social media handles, and so on); encrypted or unencrypted files; database files; network connection logs; shell history; filesystem files; libraries, frameworks, and binaries; registry entries; settings files; executing processes; hardware vendors, versions, and/or information associated with the compromised computing resource; installed applications or services; password hashes; idle time, uptime, and/or last login time; document files; product renderings; presentation files; image files; customer information; configuration files; passwords; and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first- or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Figure 4:
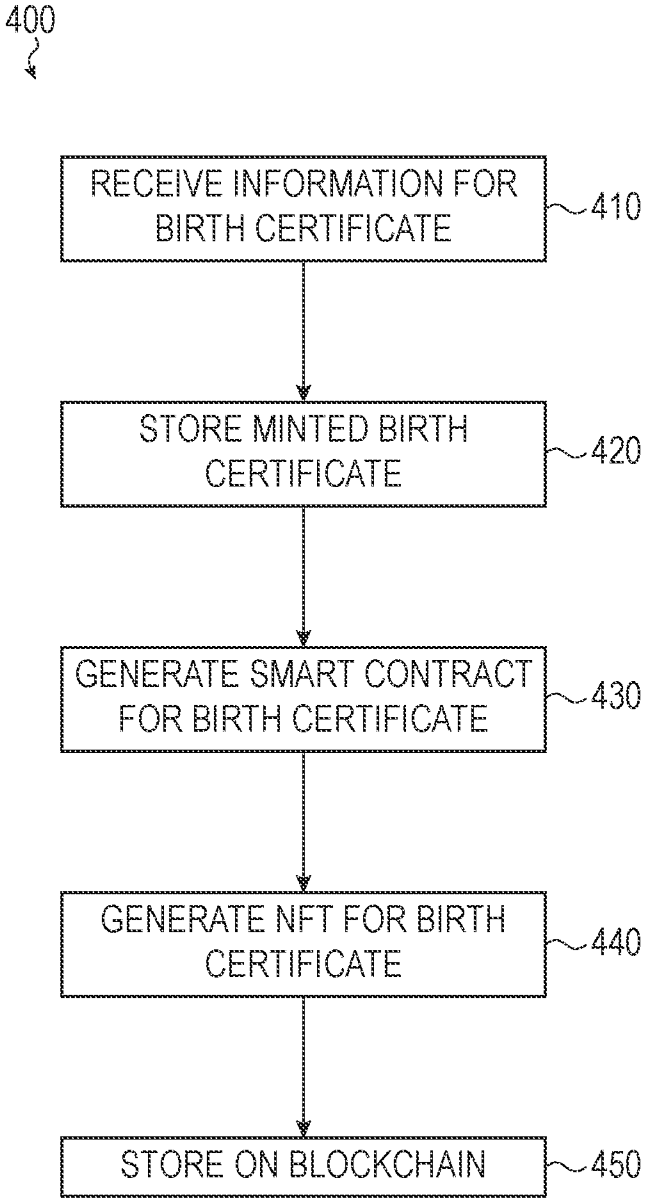
FIG. 4 depicts a flow chart illustrating a second example method for operating a non-fungible token document platform system. This method may be performed by the system of FIG. 1A.

FIG. 4 depicts a flow chart illustrating a second example method 400 for operating an NFT document platform system. This method 400 may be performed by the system 100 of FIG. 1A.

At operation 410, an electronic device (such as one or more computing devices associated with the host platform 101 of FIG. 1A, the issuer instance 102 of FIG. 1A, the user platform 103 of FIG. 1A, and/or another device or system) may receive information for a birth certificate. In some implementations, the birth certificate may already be minted. In other implementations, the electronic device may use the information to mint the birth certificate.

At operation 420, the electronic device may store the minted birth certificate. The electronic device may digitally store the minted birth certificate, such as in a storage like the secure storage 106 of FIG. 1A.

At operation 430, the electronic device may create one or more smart contracts for the minted birth certificate. The smart contract may control minting of the birth certificate, ownership of the birth certificate, status of the birth certificate, how status of the birth certificate may be changed, transfer of the birth certificate (such as from a parent or guardian of a person to the person when the person reaches the age of majority), transactions involving the birth certificate, and so on.

At operation 440, the electronic device may generate an NFT for the birth certificate. In some examples, the NFT may include an image of the birth certificate.

At operation 450, the electronic device may store the minted birth certificate, the smart contract, and/or the NFT on one or more blockchains. In some implementations, the information stored on the blockchain (such as personally identifiable information relating to the birth certificate) may be encrypted in such a way that the NFT, authorization in the smart contract, and/or other authorization in order to decrypt.

By way of example, a municipality may provide host platform information to use to mint a birth certificate for a person. The host platform may mint the birth certificate, store the minted birth certificate in a storage area, create a smart contract and an NFT for the birth certificate, store the smart contract and the NFT on a blockchain, and associate the NFT with a token wallet associated with a parent or guardian of the person. When the person reaches the age of majority, the smart contract may enable the parent or guardian of the person to transfer association of the NFT from the token wallet associated with the parent or guardian of the person to a token wallet associated with the person. Various configurations are possible and contemplated without departing from the scope of the present disclosure.

In various examples, this example method 400 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 is illustrated and described in the context of birth certificates. However, it is understood that this is an example. In some implementations, the birth certificate may instead be another kind of minted document, such as one or more contracts and other signed documents, titles (such as house titles, car titles, and so on), prescriptions, licenses and/or identification documents, checks, money, gift cards, and so on.

Figure 5:
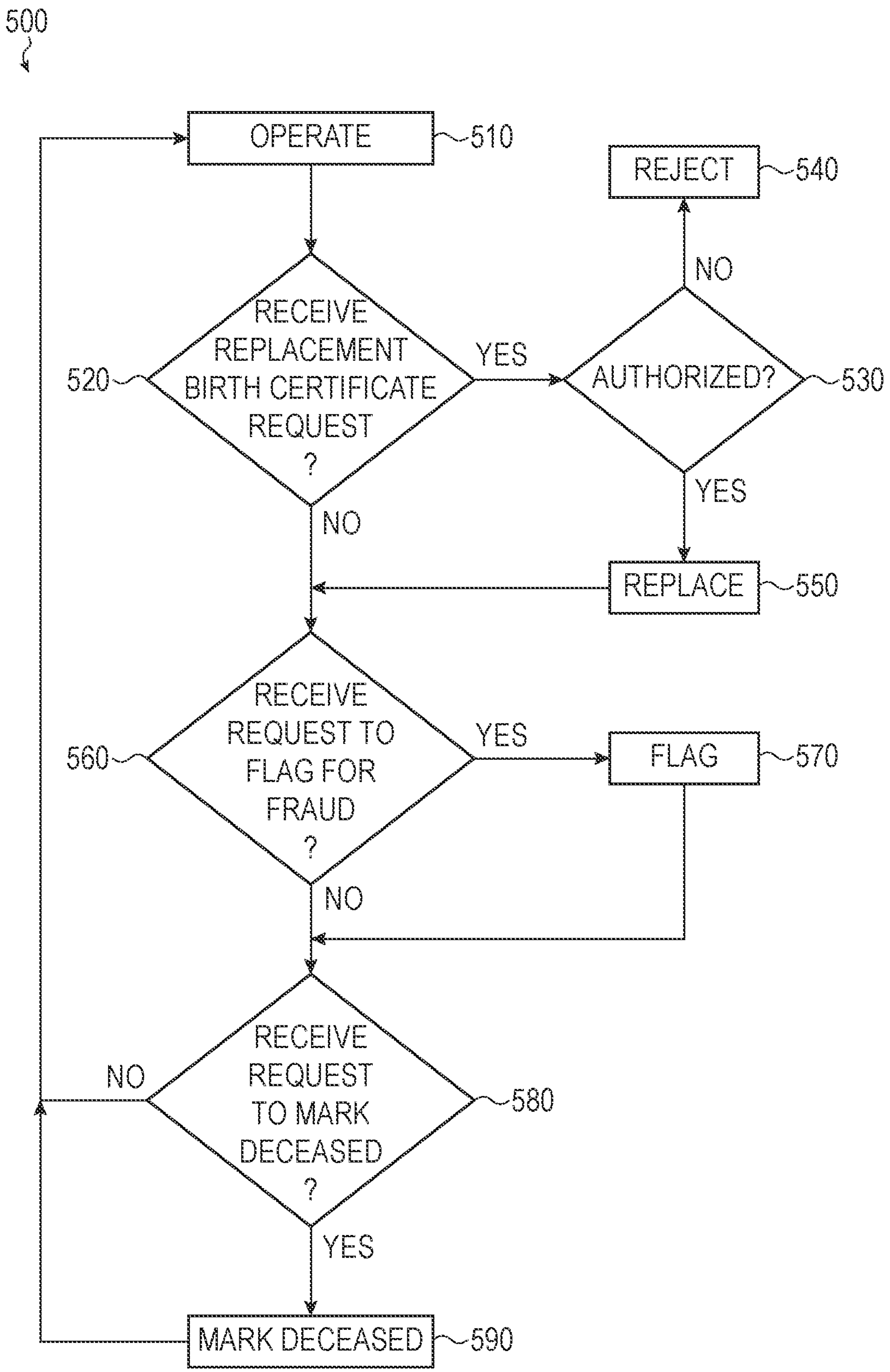
FIG. 5 depicts a flow chart illustrating a third example method for operating a non-fungible token document platform system. This method may be performed by the system of FIG. 1A.

FIG. 5 depicts a flow chart illustrating a third example method 500 for operating an NFT document platform system. This method 500 may be performed by the system 100 of FIG. 1A.

At operation 510, an electronic device (such as one or more computing devices associated with the host platform 101 of FIG. 1A, the issuer instance 102 of FIG. 1A, the user platform 103 of FIG. 1A, and/or another device or system) may operate. At operation 520, the electronic device may determine whether or not a replacement birth certificate request is received. The replacement birth certificate request may relate to a minted birth certificate, such as the minted birth certificate discussed with respect to FIG. 4. If so, the flow may proceed to operation 530. Otherwise, the flow may proceed to operation 560.

At operation 530, after the electronic device determines that a replacement birth certificate request is received, the electronic device may determine whether or not the request is authorized. Determining such authorization may involve ensuring that an NFT associated with the birth certificate is associated with a token wallet associated with the requestor. Determining such authorization may also involve determining whether or not the smart contract authorizes the requestor to request replacement of the birth certificate. Determining such authorization may further involve determining that an NFT associated with the birth certificate has been stolen and verifying that the requestor is the person for whom the birth certificate was issued (such as by verifying identification associated with the requestor, prompting the requestor to enter a one-time password transmitted to an email address or other communication identifier associated with the minted birth certificate, and so on). If so, the flow may proceed to operation 550 where the electronic device may replace the birth certificate before the flow may proceed to operation 560. Otherwise, the flow may proceed to operation 540 where the electronic device may reject the request to replace the birth certificate.

At operation 560, the electronic device may determine whether or not a request to flag a birth certificate for fraud is received. For example, a municipality that has detected an attempted stolen identity associated with the birth certificate may request the birth certificate be flagged for fraud and thus prevented from use. If so, the flow may proceed to operation 570 where the electronic device may flag the birth certificate for fraud before the flow proceeds to operation 580. Otherwise, the flow may proceed directly to operation 580.

At operation 580, the electronic device may determine whether or not a request to mark a birth certificate deceased is received. For example, a municipality where a person has died may request the birth certificate be marked deceased so that the birth certificate cannot be used to create a stolen identity. If so, the flow may proceed to operation 590 where the electronic device may mark the birth certificate deceased before the flow returns to operation 510 and the electronic device continues to operate. Otherwise, the flow may return directly to operation 510 and the electronic device continues to operate.

In various examples, this example method 500 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 illustrates the flow ending at operation 540. However, it is understood that this is an example. In some implementations, the flow may return from operation 540 to operation 510 where the electronic device may continue to operate. Various configurations are possible and contemplated without departing from the scope of the present disclosure.

By way of another example, the method 500 is illustrated and described as determining whether or not requests are received to replace a birth certificate, flag for fraud, and mark deceased, it is understood that this in an example. In some implementations, the electronic device may determine whether or not requests are received to one or more of replace a birth certificate, flag for fraud, or mark deceased without determining all three. Various configurations are possible and contemplated without departing from the scope of the present disclosure.

In still another example, the method 500 is illustrated and described as flagging a birth certificate for fraud and/or marking the birth certificate deceased in response to requests. However, it is understood that this in an example. In some implementations, the electronic device may first determine whether or not the requestor is authorized to perform such actions. Various configurations are possible and contemplated without departing from the scope of the present disclosure.

For example, in some implementations, the smart contract associated with a birth certificate may enable municipalities other than the issuer of the birth certificate to flag a birth certificate for fraud and/or mark a birth certificate deceased. However, in other implementations, the smart contract associated with a birth certificate may prevent municipalities other than the issuer of the birth certificate to flag a birth certificate for fraud and/or mark a birth certificate deceased, but may allow such other municipalities to associate such requests with the birth certificate for the issuer of the birth certificate to later act on, to request the issuer of the birth certificate to flag a birth certificate for fraud and/or mark a birth certificate deceased, and so on.

Figure 6:
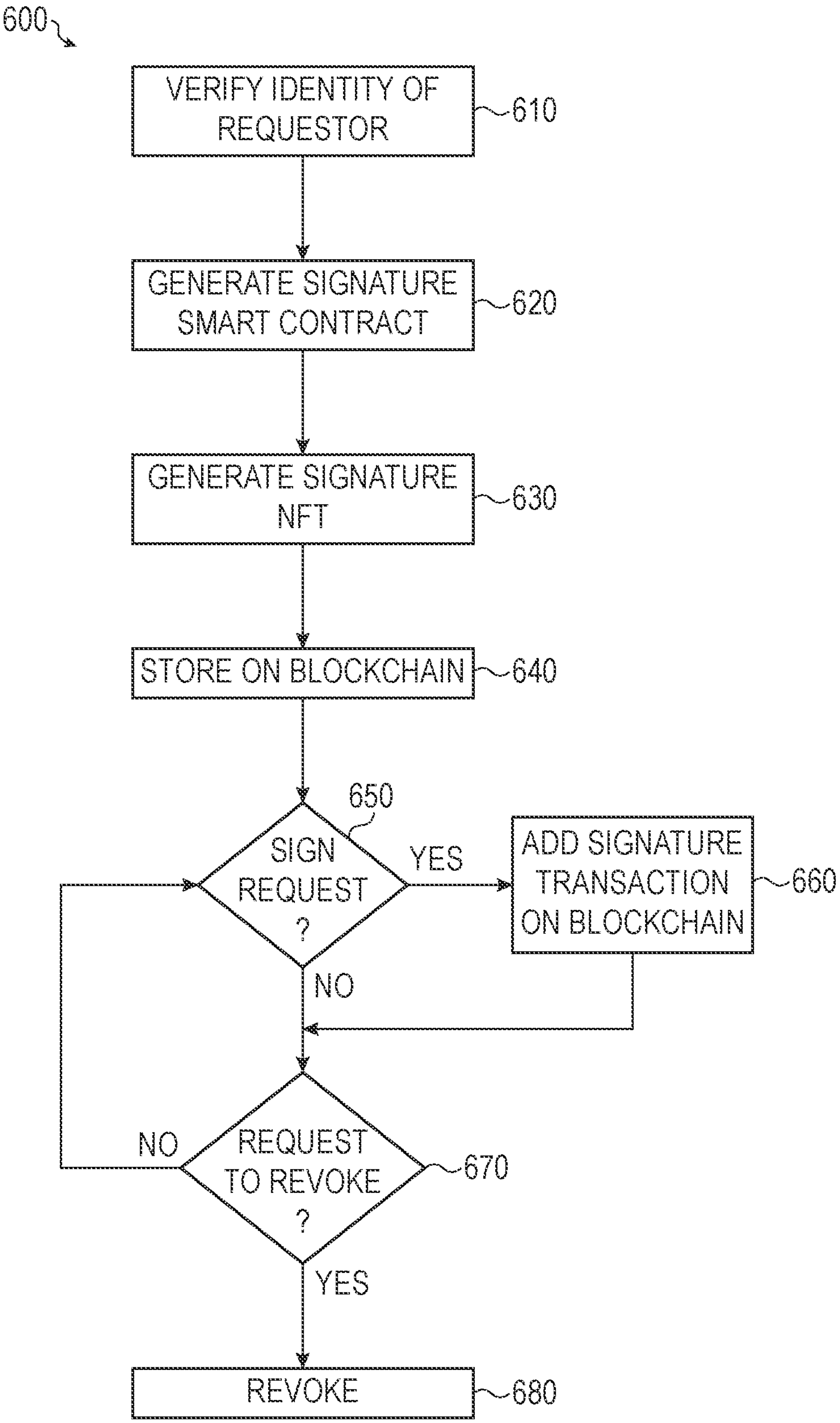
FIG. 6 depicts a flow chart illustrating a fourth example method for operating a non-fungible token document platform system. This method may be performed by the system of FIG. 1A.

FIG. 6 depicts a flow chart illustrating a fourth example method 600 for operating an NFT document platform system. This method 600 may be performed by the system 100 of FIG. 1A.

At operation 610, an electronic device (such as one or more computing devices associated with the host platform 101 of FIG. 1A, the issuer instance 102 of FIG. 1A, the user platform 103 of FIG. 1A, and/or another device or system) may verify the identity of a requestor. For example, identity verification may include obtaining a copy of the person's driver's license, subjecting the person to a quiz of facts about the person, prompting the person to provide a one-time password transmitted to an email address or other communication identifier associated with the person, and so on.

At operation 620, the electronic device may generate a signature smart contract. The signature smart contract may control what is used to digitally sign items, what may be signed under what circumstances, how the signature may be revoked, and so on.

At operation 630, the electronic device may generate a signature NFT. The NFT may include an image that the person wants to use as a signature, such as an image of the person's physical signature.

At operation 640, the electronic device may store the signature smart contract and/or the signature NFT on one or more blockchains. The signature NFT may also be associated with a token wallet associated with the person.

At operation 650, the electronic device may determine whether or not a sign request is received. The sign request may be associated with a digital document, such as a lease, a mortgage, a contract, a driver's license, a check, a payment authorization, and so on. If so, the flow may proceed to operation 660 where the electronic device may add a signature transaction associated with the signature NFT to the blockchain before the flow proceeds to operation 670. Otherwise, the flow may proceed directly to operation 670.

At operation 670, the electronic device may determine whether or not a request to revoke the signature NFT is received. If not, the flow may return to operation 650 where the electronic device may again determine whether or not a sign request is received. Otherwise, the flow may proceed to operation 680 where the electronic device may revoke the signature NFT.

In various examples, this example method 600 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 describes the same electronic device performing operations 610-640 and 650-680. However, it is understood that this is an example. In some implementations, different electronic devices may perform operations 610-640 and 650-680 and/or subgroups of operations 610-640 and 650-680. Various configurations are possible and contemplated without departing from the scope of the present disclosure.

By way of another example, the method 600 is illustrated and described as ending at operation 680. However, it is understood that this is an example. In some implementations, the flow may proceed from operation 680 to an operation where the electronic device determines whether or not to generate a new signature NFT. Various configurations are possible and contemplated without departing from the scope of the present disclosure.

Figure 7:
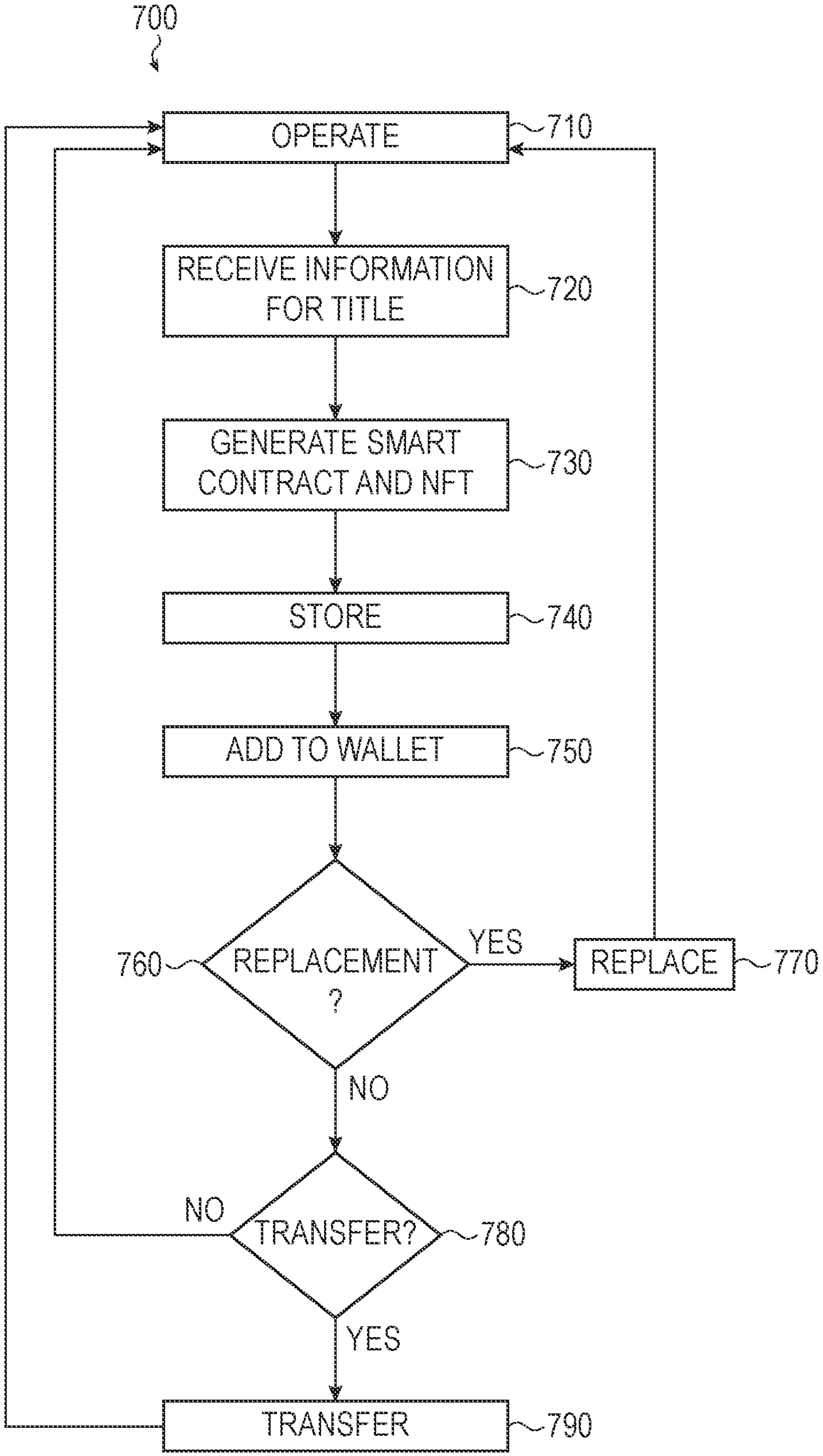
FIG. 7 depicts a flow chart illustrating a fifth example method for operating a non-fungible token document platform system. This method may be performed by the system of FIG. 1A.

FIG. 7 depicts a flow chart illustrating a fifth example method 700 for operating an NFT document platform system. This method 700 may be performed by the system 100 of FIG. 1A.

At operation 710, an electronic device (such as one or more computing devices associated with the host platform 101 of FIG. 1A, the issuer instance 102 of FIG. 1A, the user platform 103 of FIG. 1A, and/or another device or system) may operate. The flow may proceed to operation 720 where the electronic device may receive information for a title. The title may be a car title, a home title, and/or another kind of title. In some implementations, the title may already be minted. In other implementations, the electronic device may use the information to mint the title.

At operation 730, the electronic device may generate a smart contract and NFT for the title. The flow may then proceed to operation 740 where the electronic device may store the smart contract and/or the NFT and/or information for the title on one or more blockchains. Next, the flow may proceed to operation 750 where the electronic device may add the NFT to a token wallet, such as a token wallet associated with an issuer of the title, a person to whom the title is issued, and so on.

At operation 760, the electronic device may determine whether or not a request to replace the title is received. If so, the flow may proceed to operation 770 where the electronic device replaces the title before the flow returns to operation

710 and the electronic device continues to operate. Otherwise, the flow may proceed to operation 780.

In some implementations, the electronic device may determine whether or not the request to replace the title is authorized prior to replacing the title. Determining such authorization may involve ensuring that an NFT associated with the title is associated with a token wallet associated with the requestor. Determining such authorization may also involve determining whether or not the smart contract authorizes the requestor to request replacement of the title. Determining such authorization may further involve determining that access to an NFT associated with the title has been lost and verifying that the requestor is the holder of the title (such as by verifying identification associated with the requestor, prompting the requestor to enter a one-time password transmitted to an email address or other communication identifier associated with the minted birth certificate, and so on).

At operation 780, electronic device may determine whether or not a request to transfer the title is received. If so, the flow may proceed to operation 790 where the electronic device transfers the title before the flow returns to operation 710 and the electronic device continues to operate. Transferring the title may include transferring the token wallet associated with the NFT, updating the smart contract and/or the blockchain, and so on. Otherwise, the flow may directly return to operation 710 and the electronic device continues to operate.

In various examples, this example method 700 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 700 is illustrated and described as including particular operations performed in a particular order, it is understood that this is an example. In various implementations, various orders of the same, similar, and/or different operations may be performed without departing from the scope of the present disclosure.

For example, the method 700 and describes the same electronic device performing operations 720-750, 760-770, and 780-790. However, it is understood that this is an example. In some implementations, different electronic devices may perform operations 720-750, 760-770, and 780-790 and/or subgroups of operations 720-750, 760-770, and 780-790. Various configurations are possible and contemplated without departing from the scope of the present disclosure.

Figure 8:
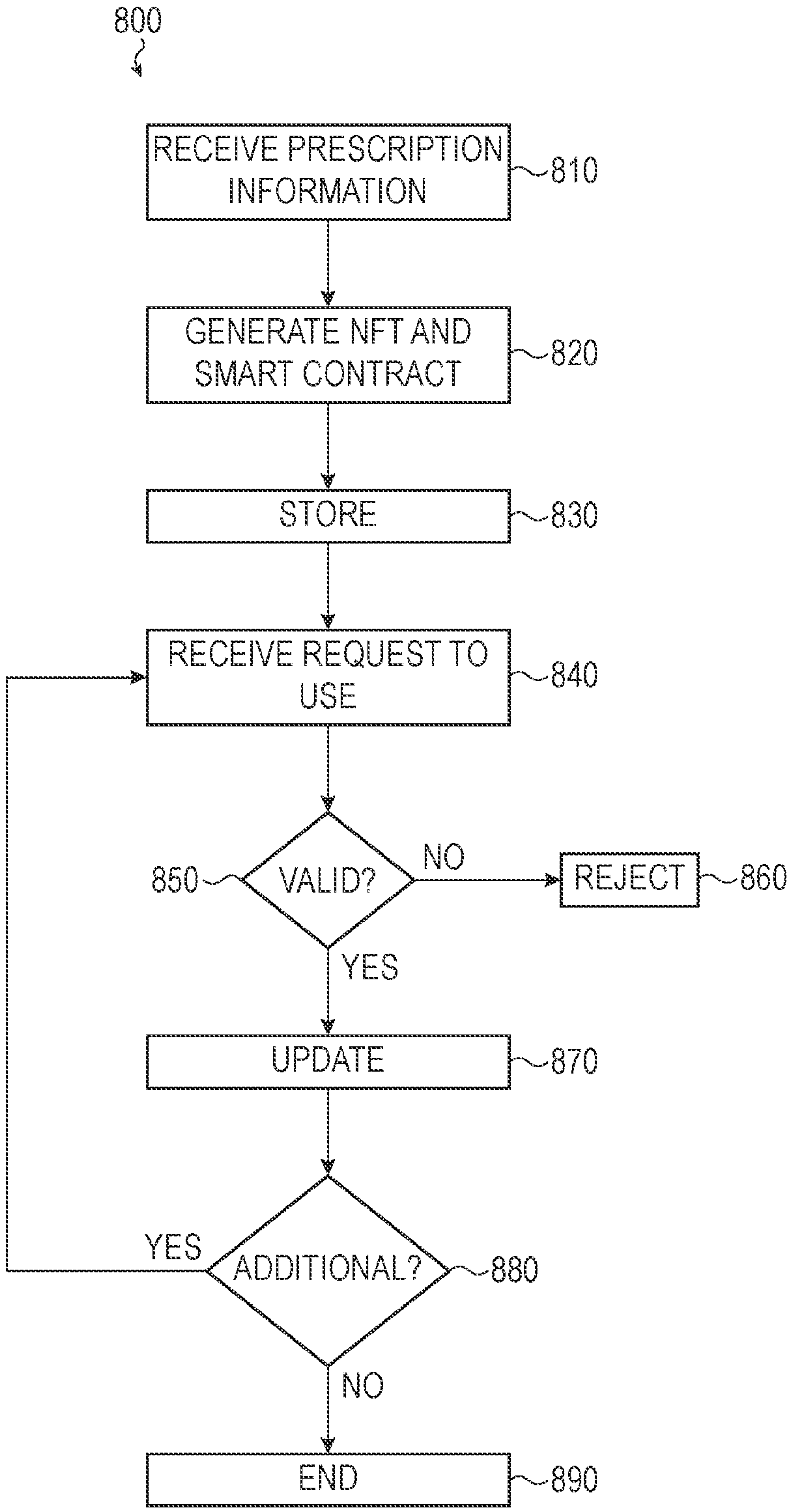
FIG. 8 depicts a flow chart illustrating a sixth example method for operating a non-fungible token document platform system. This method may be performed by the system of FIG. 1A.

FIG. 8 depicts a flow chart illustrating a sixth example method 800 for operating an NFT document platform system. This method 800 may be performed by the system 100 of FIG. 1A.

At operation 810, an electronic device (such as one or more computing devices associated with the host platform 101 of FIG. 1A, the issuer instance 102 of FIG. 1A, the user platform 103 of FIG. 1A, and/or another device or system) may receive information for a prescription. The prescription may correspond to one or more medications.

At operation 820, the electronic device may generate a smart contract and corresponding NFT for the prescription. The smart contract may control how much of what medications may be purchased, how many refills are included, and so on.

At operation 830, the electronic device may store the smart contract, NFT, and/or prescription on one or more blockchains. The electronic device may also associate the NFT with one or more token wallets.

At operation 840, the electronic device may receive a request to use the prescription, such as a request to purchase one or more medications covered by the prescription. The flow may proceed to operation 850 where the electronic device may determine whether or not the prescription is valid. If not, the flow may proceed to operation 860 where the electronic device may reject the request. Otherwise, the flow may proceed to operation 870.

At operation 870, after the electronic device determines that the prescription is valid, the electronic device may perform the request and update the prescription to indicate that the request has been performed. For prescriptions with no refills, this may include indicating that the prescription has been completed. For prescriptions with refills, this may include decrementing the refills.

The flow may then proceed to operation 880 where the electronic device may determine whether or not the prescription has any additional uses available. This may include refills that have not been used, portions of the prescription that remain unused after other portions have been filled, and so on. If so, the flow may return to operation 840 where the electronic device may receive another request to use the prescription. Otherwise, the flow may proceed to operation 890 and end.

In various examples, this example method 800 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 and describes the same electronic device performing operations 810-830 and 840-880. However, it is understood that this is an example. In some implementations, different electronic devices may perform operations 810-830 and 840-880 and/or subgroups of operations 810-830 and 840-880. Various configurations are possible and contemplated without departing from the scope of the present disclosure.

Figure 9A:
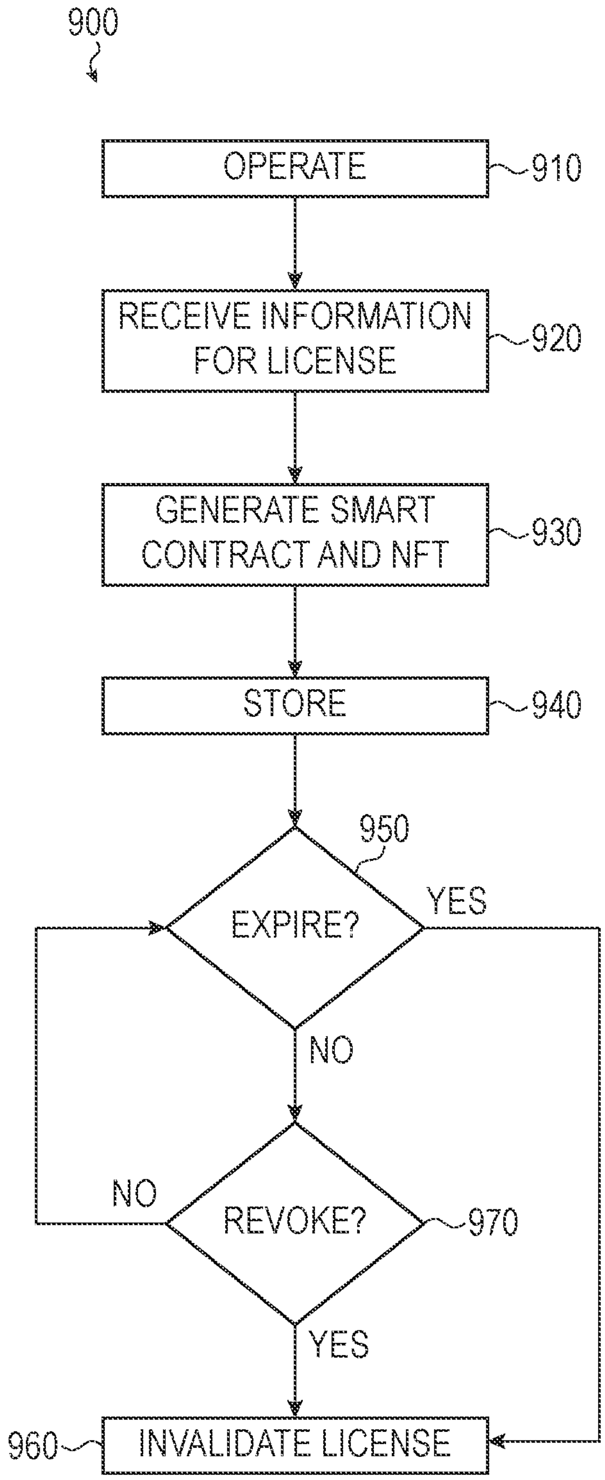
FIG. 9A depicts a flow chart illustrating a seventh example method for operating a non-fungible token document platform system. This method may be performed by the system of FIG. 1A.

FIG. 9A depicts a flow chart illustrating a seventh example method 900 for operating an NFT document platform system. This method 900 may be performed by the system 100 of FIG. 1A.

At operation 910, an electronic device (such as one or more computing devices associated with the host platform 101 of FIG. 1A, the issuer instance 102 of FIG. 1A, the user platform 103 of FIG. 1A, and/or another device or system) may operate. The flow may then proceed to operation 920 where the electronic device may receive information for a license, such as a driver's license. In some implementations, the license may already be license minted. In other implementations, the electronic device may use the information to mint the title.

At operation 930, the electronic device may generate a smart contract and an associated NFT for the license. The smart contract may control parameters of the license such as an expiration data, a status, and so on. The flow may then proceed to operation 940 where the electronic device may store the smart contract, NFT, and/or license on one or more blockchains. The electronic device may also associate the NFT with one or more token wallets.

Next, the flow may proceed to operation 950 where the electronic device may determine whether or not the license is expired. If so, the flow may proceed to operation 960 where the electronic device may invalidate the license. Otherwise, the flow may proceed to operation 970.

At operation 970, the electronic device may determine whether or not to revoke the license. The electronic device may revoke the license for excessive moving violations, excessive tickets, in response to a request to revoke the license, and so on. If so, the flow may proceed to operation 960 where the electronic device may invalidate the license. Otherwise, the flow may return to operation 950 where the electronic device may again determine whether or not the license is expired.

In various examples, this example method 900 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 900 is illustrated and described as including particular operations performed in a particular order, it is understood that this is an example. In various implementations, various orders of the same, similar, and/or different operations may be performed without departing from the scope of the present disclosure.

For example, the method 900 and describes the same electronic device performing operations 920-940 and 950-960. However, it is understood that this is an example. In some implementations, different electronic devices may perform operations 920-940 and 950-960 and/or subgroups of operations 920-940 and 950-960. Various configurations are possible and contemplated without departing from the scope of the present disclosure.

By way of another example, the method 900 is illustrated and described as invalidating the license when the electronic device determines that the license is expired. However, it is understood that this is an example. In some implementations, the license, NFT, and/or smart contract may automatically be invalid upon reaching an expiration date included in the license, NFT, and/or smart contract. Various configurations are possible and contemplated without departing from the scope of the present disclosure.

Figure 9B:
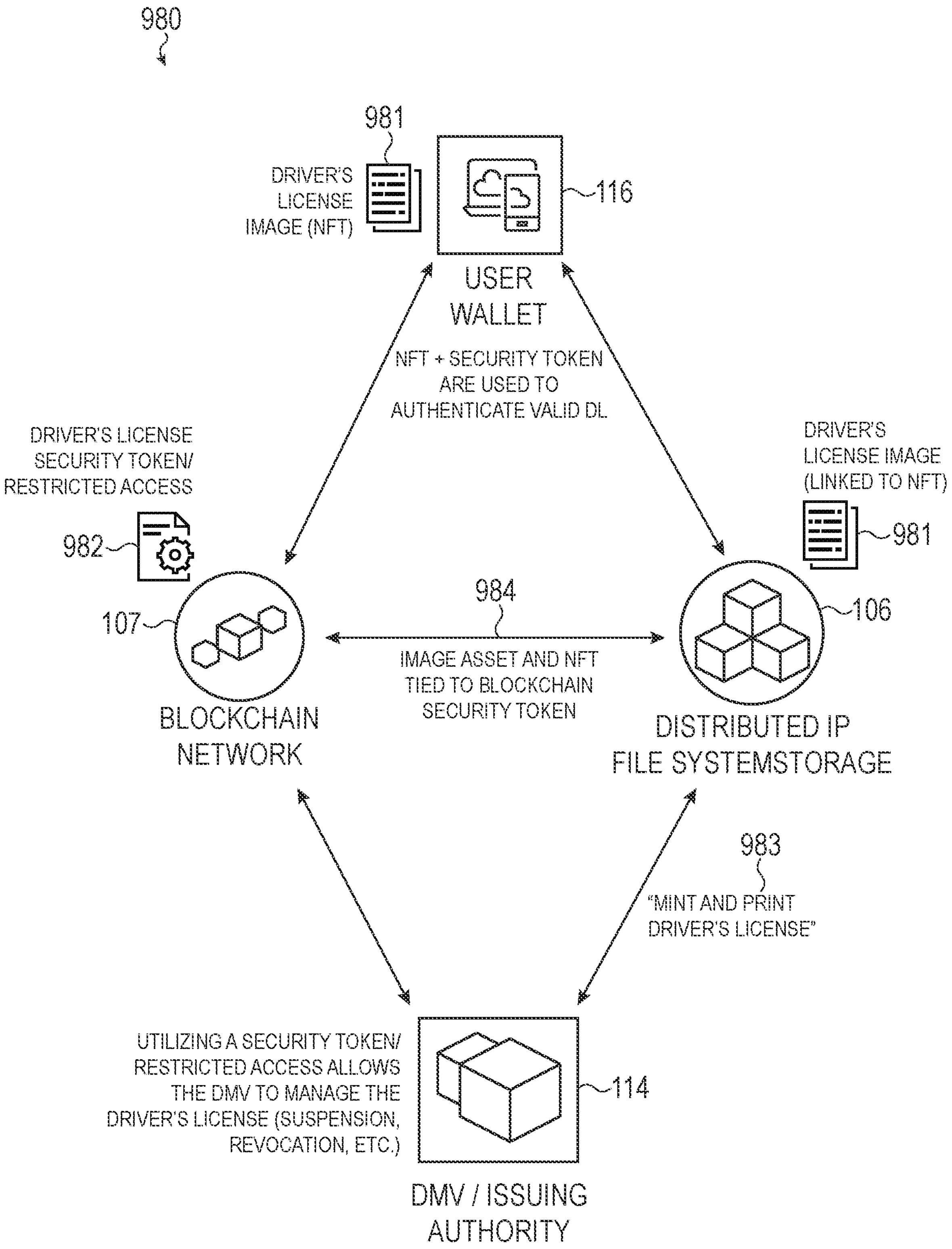
FIG. 9B depicts creation and minting of a driver's license.

FIG. 9B depicts creation and minting 980 of a driver's license. A minting authority 114 that may be a DMV (department of motor vehicles)/issuing authority may mint and print 983 a driver's license by sending driver's license information to a secure storage 106 that may be distributed IP (internet protocol) file systems storage (such as the secure storage 106 of FIG. 1A). A smart contract and NFT associated with the driver's license information may be generated and stored on a blockchain 107 that may be a blockchain network (such as the blockchain 107 of FIG. 1A). The NFT and/or an image asset for the driver's license may link 984 the driver's license information in the secure storage 106 to the blockchain 107. One or more driver's license security tokens 982 may be linked in the blockchain 107 to the NFT and/or be the NFT in order to enable restricted access to the driver's license. The blockchain 107 and the secure storage 106 may be linked to a user wallet 116 that may be a token wallet. A driver's license image 981 that is linked to the NFT and/or may be the NFT may link the secure storage 106 and the user wallet 116. The one or more driver's license security tokens 982 may be used (with or without the NFT) to authenticate a valid driver's license, manage the driver's license (such as to suspend the driver's license, revoke the driver's license, and so on) (such as by the DMV).

Figure 10:
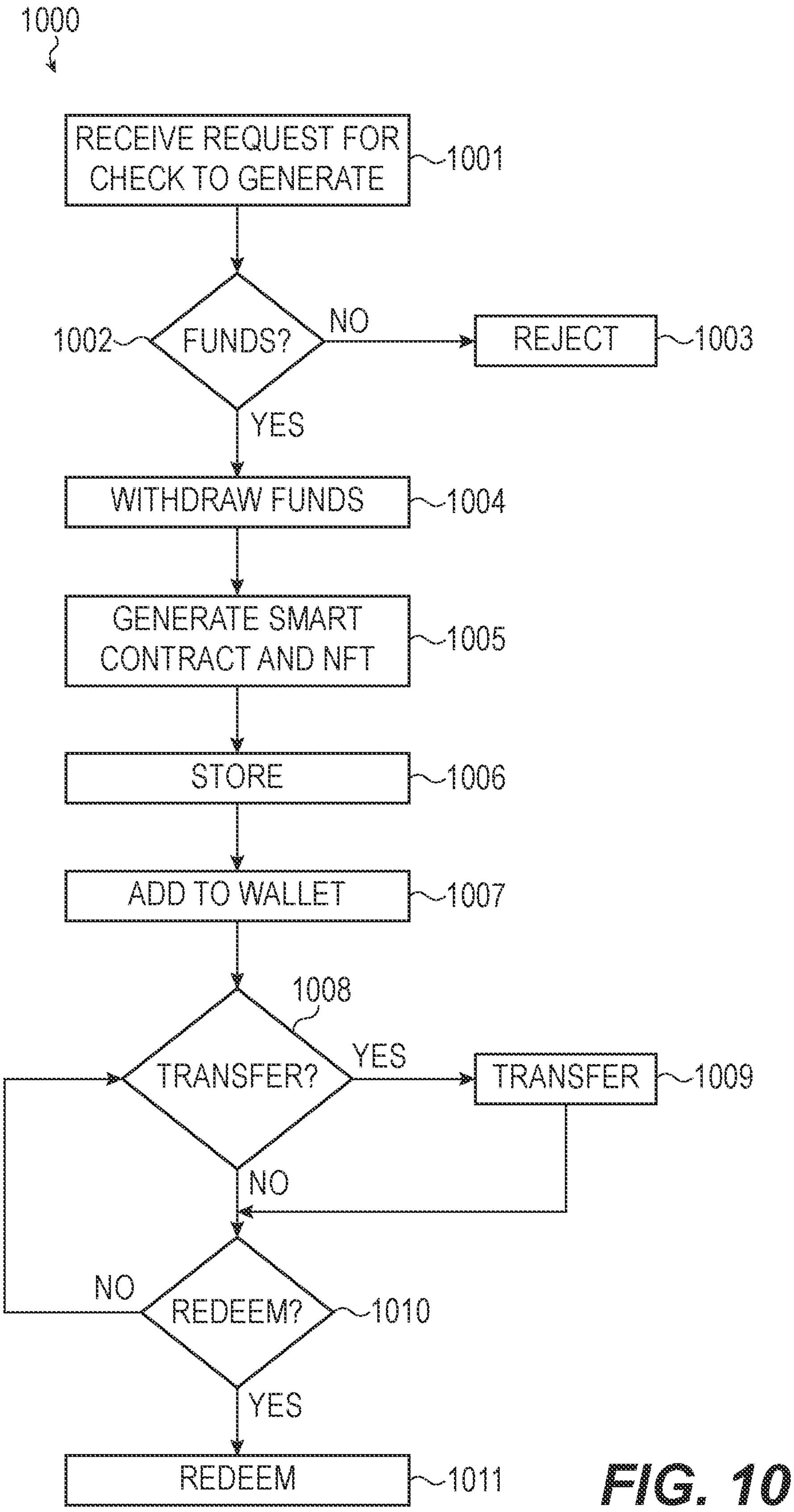
FIG. 10 depicts a flow chart illustrating an eighth example method for operating a non-fungible token document platform system. This method may be performed by the system of FIG. 1A.

FIG. 10 depicts a flow chart illustrating an eighth example method 1000 for operating an NFT document platform system. This method 1000 may be performed by the system 100 of FIG. 1A.

At operation 1001, an electronic device (such as one or more computing devices associated with the host platform 101 of FIG. 1A, the issuer instance 102 of FIG. 1A, the user platform 103 of FIG. 1A, and/or another device or system) may receive information for a check to generate. The flow may proceed to 1002 where the electronic device may determine whether or not sufficient funds for the check are available (such as in a checking, savings, and/or other account). If not, the flow may proceed to operation 1003 where the electronic device may reject the request. Otherwise the flow may proceed to operation 1004.

At operation 1004, after the electronic device determines that sufficient funds for the check are available, the electronic device may withdraw the funds. The flow may proceed to operation 1005 where the electronic device may generate an NFT and an associated smart contract for the check. The flow may then proceed to operation 1006 where the electronic device may store the NFT and the associated contract on one or more blockchains. The flow may then proceed to operation 1007 where the electronic device may associate the NFT and/or associated check with a token wallet.

Next, the flow may proceed to operation 1008 where the electronic device may determine whether or not to transfer the NFT and/or associated check, such as in response to a transfer request. If so, the flow may proceed to operation 1009 where the electronic device may transfer the NFT and/or associated check from the token wallet to another token wallet before the flow proceeds to operation 1010. Otherwise, the flow may proceed directly to operation 1010.

At operation 1010, the electronic device may determine whether or not to redeem the NFT and/or associated check. If so, the flow may proceed to operation 1011 where the electronic device may redeem the NFT and/or associated check (which may involve invalidating the NFT, transferring the funds associate with the NFT and/or associated check to the person presenting the NFT and/or associated check for redemption, and so on). Otherwise, the flow may return to operation 1008 where the electronic device may again determine whether or not to transfer the NFT and/or associated check.

In this way, the NFT may be used to generate fiat money that has an actual value tied to the amount of funds used to generate the NFT without requiring any databases to maintain records of funds and/or other such mechanisms. Various configurations are possible and contemplated without departing from the scope of the present disclosure.

In various examples, this example method 1000 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 1000 is illustrated and described as including particular operations performed in a particular order, it is understood that this is an example. In various implementations, various orders of the same, similar, and/or different operations may be performed without departing from the scope of the present disclosure.

For example, the method 1000 and describes the same electronic device performing operations 1001-1007 and 1008-1011. However, it is understood that this is an example. In some implementations, different electronic devices may perform operations 1001-1007 and 1008-1011 and/or subgroups of operations 1001-1007 and 1008-1011. Various configurations are possible and contemplated without departing from the scope of the present disclosure.

By way of another example, the method 1000 is illustrated and described in the context of checks. However, it is understood that this is an example. In other implementations, other payment methods may be used instead. Various configurations are possible and contemplated without departing from the scope of the present disclosure.

Figure 11:
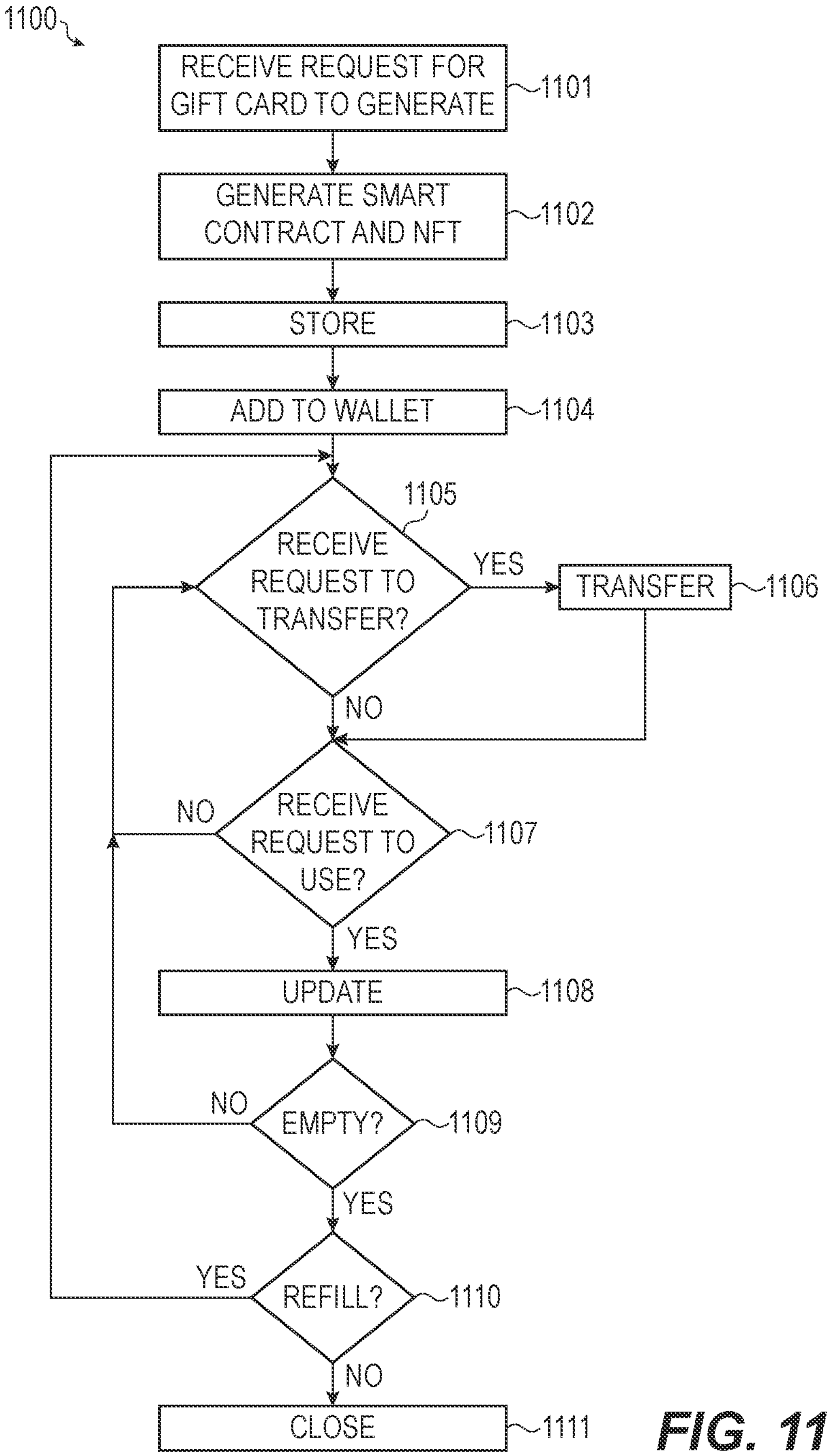
FIG. 11 depicts a flow chart illustrating a ninth example method for operating a non-fungible token document platform system. This method may be performed by the system of FIG. 1A.

FIG. 11 depicts a flow chart illustrating a ninth example method 1100 for operating an NFT document platform system. This method 1100 may be performed by the system 100 of FIG. 1A.

At operation 1101, an electronic device (such as one or more computing devices associated with the host platform 101 of FIG. 1A, the issuer instance 102 of FIG. 1A, the user platform 103 of FIG. 1A, and/or another device or system) may receive a request for a gift card to generate.

The flow may proceed to operation 1102 where the electronic device may generate an NFT and an associated smart contract for the gift card. The flow may then proceed to operation 1103 where the electronic device may store the NFT and the associated contract on one or more blockchains. The flow may then proceed to operation 1104 where the electronic device may associate the NFT with a token wallet.

Next, the flow may proceed to operation 1105 where the electronic device may determine whether or not to transfer the NFT and/or associated gift card, such as in response to a transfer request. If so, the flow may proceed to operation 1106 where the electronic device may transfer the NFT and/or associated gift card from the token wallet to another token wallet before the flow proceeds to operation 1107. Otherwise, the flow may proceed directly to operation 1107.

At operation 1107, the electronic device may determine whether or not a request to use the NFT and/or associated gift card is received. If so, the flow may proceed to operation 1108 where the electronic device may update one or more of the NFT and/or associated gift card, smart contract, blockchain and so on for the use before the flow proceeds to operation 1109. Otherwise, the flow may proceed directly to operation 1109.

At operation 1109, the electronic device may determine whether or not the NFT and/or associated gift card is empty. If so, the flow may proceed to operation 1110. Otherwise, the flow may return to operation 1105 where the electronic device may determine whether or not to transfer the NFT and/or associated gift card.

At operation 1110, the electronic device may determine whether or not to refill the NFT. If so, the electronic device may refill the NFT and/or associated gift card before the flow returns to on 1105 where the electronic device may determine whether or not to transfer the NFT. Otherwise, the flow may return to operation 1111 where the electronic device may close the NFT and/or associated gift card.

In this way, the NFT may be used to implement a gift card system without requiring any databases to maintain records of gift card balances and/or other such mechanisms. Various configurations are possible and contemplated without departing from the scope of the present disclosure.

In various examples, this example method 1100 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 1100 is illustrated and described as including particular operations performed in a particular order, it is understood that this is an example. In various implementations, various orders of the same, similar, and/or different operations may be performed without departing from the scope of the present disclosure.

For example, the method 1100 and describes the same electronic device performing operations 1101-1104 and 1105-1111. However, it is understood that this is an example. In some implementations, different electronic devices may perform operations 1101-1104 and 1105-1111 and/or subgroups of operations 1101-1104 and 1105-1111. Various configurations are possible and contemplated without departing from the scope of the present disclosure.

In various implementations, a host platform system may include a non-transitory storage medium that stores instructions and a processor. The processor may execute the instructions to receive information for a minted document, generate a smart contract and an associated non-fungible token (NFT) for the minted document, store the smart contract and the associated NFT on a blockchain, and add the associated NFT to a token wallet.

In some examples, the processor may store the information for the minted document. In a number of such examples, the processor may store the information for the minted document in a storage area separate from the blockchain.

In various examples, the processor may mint the minted document. In some examples, the minted document may be a birth or death certificate a contract, a signed document, a title, a prescription, a license, an identification document, a check, a receipt, a credit card, a lien, tax records, an invoice, money, fungible currency; a ticket, a certificate, a diploma; a judicial orders, a filing, a judgment, a medical record, an invitation, a certificate of authenticity, a gift card, a coupon, or a document that can be authenticated using an NFT.

In a number of examples, the processor may implement a frontend that is operable to communicate with an issuer instance that issued the minted document. In various such examples, the processor may be operable to modify at least one of the associated NFT or the smart contract in response to a request from the issuer instance received via the frontend.

In some examples, the processor may implement a frontend that is operable to communicate with the token wallet. In a number of examples, the processor may generate the token wallet. In various such examples, the processor may generate the token wallet using a communication identifier provided with the information for the minted document. In some such examples, the processor may transmit a notification regarding the NFT to the communication identifier.

In a number of examples, a portion of the smart contract on the blockchain may be encrypted. In various examples, a portion of the NFT on the blockchain may be encrypted. In a number of examples, the smart contract may control use of the NFT.

In some implementations, a method may include verifying the identity of a requestor using at least one processor, generating a signature smart contract using the at least one processor, generating a signature NFT using the at least one processor, storing the signature smart contract and the signature NFT on a blockchain using the at least one processor, and adding a signature transaction on the blockchain using the at least one processor in response to receiving a sign request from the requestor.

In various examples, the signature NFT may include an image of a signature of the requestor. In some examples, the blockchain may track a token wallet associated with the signature NFT.

In a number of implementations, a method may include receiving a request for a check to generate using at least one processor, withdrawing funds for the check using the at least one processor, generating an NFT and an associated smart contract for the check using the at least one processor, storing the NFT and the associated smart contract on a blockchain using the at least one processor, and associating the NFT with a token wallet using the at least one processor.

In various examples, the method may further include redeeming the NFT. In some such examples, redeeming the NFT may include revoking the NFT and providing the funds.

Although the above illustrates and describes a number of embodiments, it is understood that these are examples. In various implementations, various techniques of individual embodiments may be combined without departing from the scope of the present disclosure.

As described above and illustrated in the accompanying figures, the present disclosure relates to an NFT document platform. The NFT document platform includes a host platform that is operable to create and/or perform one or more transactions related to one or more NFTs on behalf of and/or for one or more other entities, such as one or more issuer instances, user platforms, intermediaries, and so on. Creation of the NFTs may involve creation of one or more smart contracts, storage of the smart contracts and/or the NFTs in one or more blockchains, and so on. The NFT document platform may also be operable to mint one or more documents, such as one or more birth certificates, contracts and other signed documents, titles (such as house titles, car titles, and so on), prescriptions, licenses and/or identification documents, checks, money, gift cards, and so on. The smart contracts and/or NFTs may correspond to the one or more minted documents. The NFTs may be usable to authenticate the minted documents, evidence ownership of the minted documents, control the ability to perform transactions regarding the minted documents, and so on.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A host platform system, comprising:

a non-transitory storage medium that stores instructions; and a processor that executes the instructions to:

receive at a frontend of a host platform from a minting authority of an issuer instance, information for a minted document that includes a key unique element that is uniquely associated with the minted document, minted documents being created by uniquely associating a physical document or digital document with one or more smart contracts or non-fungible tokens;

generate a smart contract and an associated non-fungible token (NFT) for the minted document using one or more backend services of the host platform and at least the key unique element of the information, the associated NFT being distinct from the minted document;

store the smart contract and the associated NFT on a blockchain using the one or more backend services of the host platform;

store the information in association with the smart contract and the associated NFT using the one or more backend services of the host platform;

add the associated NFT to a token wallet using the one or more backend services of the host platform;

receive a request to authenticate the minted document at the frontend of the host platform from a user platform; and provide an authentication response to the user platform from the front end of the host platform based at least on comparison using the one or more backend services of the host platform of the key unique element stored in association with the smart contract and the associated NFT and the key element used to generate the smart contract and the associated NFT.

2. The host platform system of claim 1, wherein the processor stores the information for the minted document in a secure storage.

3. The host platform system of claim 2, wherein the processor stores the information for the minted document in a storage area separate from the blockchain.

4. The host platform system of claim 1, wherein the processor mints the minted document.

5. The host platform system of claim 1, wherein the minted document is at least one of:

a birth or death certificate;
a contract;
a signed document;
a title;
a prescription;
a license;
an identification document;
a check;
a receipt;
a credit card;
a lien;
tax records;
an invoice;
money;
fungible currency;
a ticket;
a certificate;
a diploma;
a judicial order;
a filing;
a judgment;
a medical record;
an invitation;
a certificate of authenticity;
a gift card;
a coupon; or
a document that can be authenticated using an NFT.

6. The host platform system of claim 1, wherein the processor implements the frontend.

7. The host platform system of claim 6, wherein the processor is operable to modify at least one of the associated NFT or the smart contract in response to a request from the issuer instance received via the frontend.

8. The host platform system of claim 1, wherein the processor is operable to communicate with the token wallet via the frontend.

9. The host platform system of claim 1, wherein the processor generates the token wallet.

10. The host platform system of claim 9, wherein the processor generates the token wallet using a communication identifier provided with the information for the minted document.

11. The host platform system of claim 10, wherein the processor transmits a notification regarding the NFT to the communication identifier.

12. The host platform system of claim 1, wherein a portion of the smart contract on the blockchain is encrypted.

13. The host platform system of claim 1, wherein a portion of the NFT on the blockchain is encrypted.

14. The host platform system of claim 1, wherein the smart contract controls use of the NFT.

15. A method comprising:

verifying an identity of a requestor using one or more backend services of a host platform via at least one processor, the requestor indicating to a frontend of the host platform via a user platform to generate a signature smart contract usable by the requestor as a digital signature;

generating the signature smart contract using the one or more backend services of the host platform via the at least one processor;

generating a signature non-fungible token (NFT) using the one or more backend services of the host platform via the at least one processor;

storing the signature smart contract and the signature NFT on a blockchain using the one or more backend services of the host platform via the at least one processor; and adding a signature transaction to at least one block on the blockchain associated with the signature smart contract and the signature NFT using the at least one processor in response to receiving a sign request from the requestor received via the frontend of the host platform from the user platform, the sign request indicating to use the signature smart contract and the signature NFT to digitally sign for the requestor using the digital signature.

16. The method of claim 15, wherein the signature NFT includes an image of a signature of the requestor.

17. The method of claim 15, wherein the blockchain tracks a token wallet associated with the signature NFT.

18. A method comprising:

receiving at a frontend of a host platform from a user platform a request for a check to generate using at least one processor, the request specifying check information including funds and a funds source for the check;

withdrawing the funds for the check from the funds source using one or more backend services of the host platform via the at least one processor;

generating a non-fungible token (NFT) and an associated smart contract for the check using the one or more backend services of the host platform via the at least one processor;

storing the NFT and the associated smart contract on a blockchain using the one or more backend services of the host platform via the at least one processor;

recording at least a portion of the check information including the funds in at least one of the NFT, the associated smart contract, or at least one block on the blockchain using the one or more backend services of the host platform via the at least one processor;

associating the NFT with a token wallet using the one or more backend services of the host platform via the at least one processor;

receiving a request associated with redeeming the check using the one or more backend services of the host platform via the at least one processor; and providing a response to the request associated with redeeming the check via the frontend of the host platform based at least on the NFT.

19. The method of claim 18, further comprising redeeming the NFT.

20. The method of claim 19, wherein redeeming the NFT comprises revoking the NFT and providing the funds.

* * * * *